United States Patent
Xu

(10) Patent No.: US 11,238,130 B2
(45) Date of Patent: Feb. 1, 2022

(54) SIGNAL PROCESSING METHOD AND APPARATUS

(71) Applicant: Huawei Technologies Co., Ltd., Shenzhen (CN)

(72) Inventor: Ruosheng Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 7 days.

(21) Appl. No.: 16/915,156

(22) Filed: Jun. 29, 2020

(65) Prior Publication Data

US 2020/0327185 A1    Oct. 15, 2020

Related U.S. Application Data

(63) Continuation of application No. PCT/CN2018/116534, filed on Nov. 20, 2018.

(30) Foreign Application Priority Data

Dec. 29, 2017  (CN) .......................... 201711489008.9

(51) Int. Cl.
*G06F 17/16* (2006.01)
*G06N 3/04* (2006.01)

(52) U.S. Cl.
CPC .............. *G06F 17/16* (2013.01); *G06N 3/04* (2013.01)

(58) Field of Classification Search
CPC ........ G06F 17/16; G06N 3/04; G06N 3/0454; G06N 3/08; G06N 3/063; G06K 9/4628; G06K 9/6273; G06K 9/00288

USPC ......................................................... 708/607
See application file for complete search history.

(56) References Cited

U.S. PATENT DOCUMENTS

| | | | |
|---|---|---|---|
| 4,843,587 | A | 6/1989 | Schlunt et al. |
| 6,073,204 | A | 6/2000 | Lakhani et al. |
| 6,787,825 | B1 | 9/2004 | Gudesen et al. |
| 2016/0062947 | A1 | 3/2016 | Chetlur et al. |
| 2017/0103040 | A1 | 4/2017 | Henry et al. |
| 2017/0270073 | A1 | 9/2017 | Badin et al. |
| 2020/0110989 | A1* | 4/2020 | Xu .................... G06N 3/063 |

FOREIGN PATENT DOCUMENTS

| | | |
|---|---|---|
| CN | 1316102 A | 10/2001 |
| CN | 1437417 A | 8/2003 |
| CN | 1756190 A | 4/2006 |

(Continued)

OTHER PUBLICATIONS

Chetlur, S., et al., "cuDNN: efficient primitives for deep learning," arXiv:1410.0759v3, Oct. 18, 2014, 9 pages.

(Continued)

*Primary Examiner* — Tan V Mai
(74) *Attorney, Agent, or Firm* — Conley Rose, P.C.

(57) ABSTRACT

A signal processing method and apparatus, where the method includes partitioning a signal matrix to obtain X×H fractal signal matrices, partitioning a weight matrix to obtain H×Y fractal weight matrices, obtaining an operation sequence of X×H×Y matrix multiplications based on performance parameters, and processing the X×H×Y matrix multiplications to obtain X×Y result matrices, where the operation sequence of the X×H×Y matrix multiplications is obtained.

20 Claims, 9 Drawing Sheets

(56) References Cited

FOREIGN PATENT DOCUMENTS

| CN | 104899182 A | 9/2015 |
|----|-------------|--------|
| CN | 104915322 A | 9/2015 |

OTHER PUBLICATIONS

Lan, Q., et al., "High Performance Implementation of 3D Convolutional Neural Networks on a GPU," Computational Intelligence and Neuroscience, vol. 2017, Nov. 8, 2017, 9 pages.

Shen, J., et al., "A matrix multiplication accelerator design for optimization blocking strategy," Computer Engineering and Science, vol. 38, No. 9, Sep. 2016, 7 pages. With English abstract.

\* cited by examiner

| | | | | | | | |
|---|---|---|---|---|---|---|---|
| 0,0 | 0,1 | 0,2 | 0,3 | 0,4 | 0,5 | 0,6 | 0,7 |
| 1,0 | 1,1 | 1,2 | 1,3 | 1,4 | 1,5 | 1,6 | 1,7 |
| 2,0 | 2,1 | 2,2 | 2,3 | 2,4 | 2,5 | 2,6 | 2,7 |
| 3,0 | 3,1 | 3,2 | 3,3 | 3,4 | 3,5 | 3,6 | 3,7 |
| 4,0 | 4,1 | 4,2 | 4,3 | 4,4 | 4,5 | 4,6 | 4,7 |
| 5,0 | 5,1 | 5,2 | 5,3 | 5,4 | 5,5 | 5,6 | 5,7 |
| 6,0 | 6,1 | 6,2 | 6,3 | 6,4 | 6,5 | 6,6 | 6,7 |
| 7,0 | 7,1 | 7,2 | 7,3 | 7,4 | 7,5 | 7,6 | 7,7 |

A

×

| | | | | | | | |
|---|---|---|---|---|---|---|---|
| 0,0 | 0,1 | 0,2 | 0,3 | 0,4 | 0,5 | 0,6 | 0,7 |
| 1,0 | 1,1 | 1,2 | 1,3 | 1,4 | 1,5 | 1,6 | 1,7 |
| 2,0 | 2,1 | 2,2 | 2,3 | 2,4 | 2,5 | 2,6 | 2,7 |
| 3,0 | 3,1 | 3,2 | 3,3 | 3,4 | 3,5 | 3,6 | 3,7 |
| 4,0 | 4,1 | 4,2 | 4,3 | 4,4 | 4,5 | 4,6 | 4,7 |
| 5,0 | 5,1 | 5,2 | 5,3 | 5,4 | 5,5 | 5,6 | 5,7 |
| 6,0 | 6,1 | 6,2 | 6,3 | 6,4 | 6,5 | 6,6 | 6,7 |
| 7,0 | 7,1 | 7,2 | 7,3 | 7,4 | 7,5 | 7,6 | 7,7 |

B

=

| | | | | | | | |
|---|---|---|---|---|---|---|---|
| 0,0 | 0,1 | 0,2 | 0,3 | 0,4 | 0,5 | 0,6 | 0,7 |
| 1,0 | 1,1 | 1,2 | 1,3 | 1,4 | 1,5 | 1,6 | 1,7 |
| 2,0 | 2,1 | 2,2 | 2,3 | 2,4 | 2,5 | 2,6 | 2,7 |
| 3,0 | 3,1 | 3,2 | 3,3 | 3,4 | 3,5 | 3,6 | 3,7 |
| 4,0 | 4,1 | 4,2 | 4,3 | 4,4 | 4,5 | 4,6 | 4,7 |
| 5,0 | 5,1 | 5,2 | 5,3 | 5,4 | 5,5 | 5,6 | 5,7 |
| 6,0 | 6,1 | 6,2 | 6,3 | 6,4 | 6,5 | 6,6 | 6,7 |
| 7,0 | 7,1 | 7,2 | 7,3 | 7,4 | 7,5 | 7,6 | 7,7 |

SIGNAL PROCESSING METHOD AND APPARATUS

CROSS-REFERENCE TO RELATED APPLICATIONS

This application is a continuation of International Patent Application No. PCT/CN2018/116534 filed on Nov. 20, 2018, which claims priority to Chinese Patent Application No. 201711489008.9 filed on Dec. 29, 2017. The disclosures of the aforementioned applications are hereby incorporated by reference in their entireties.

TECHNICAL FIELD

Embodiments of this application relate to the field of computer technologies, and in particular, to a signal processing method and apparatus.

BACKGROUND

A neural network (NN) is a network structure that imitates an animal NN behavior characteristic to perform information processing. The structure includes a large quantity of nodes (or neurons) connected to each other, and is used to process information by learning and training input information based on a specific operation model. A NN includes an input layer, a hidden layer, and an output layer. The input layer is responsible for receiving an input signal. The output layer is responsible for outputting a calculation result of the NN. The hidden layer is responsible for calculation processes such as learning and training, and is a memory unit of the network. A memory function of the hidden layer is represented by a weight matrix. Generally, each neuron corresponds to a weight coefficient.

A convolutional NN (CNN) is a multi-layer NN, in which each layer includes a plurality of two-dimensional planes, each plane includes a plurality of independent neurons, a plurality of neurons in each plane share a weight, and a quantity of parameters in the NN can be reduced by weight sharing. Currently, in the CNN, a convolution operation performed by a processor is usually as follows: converting convolution of an input signal feature and a weight into a matrix multiplication operation between a signal matrix and a weight matrix. During a specific matrix multiplication operation, the signal matrix and the weight matrix are partitioned to obtain a plurality of fractal signal matrices and fractal weight matrices, and then matrix multiplication and accumulation operations are performed on the plurality of fractal signal matrices and fractal weight matrices. For example, as shown in FIG. 1, it is assumed that C meets C=AB, A is a signal matrix, and B is a weight matrix. In this case, during a matrix multiplication operation, because a processor may lack a capability of calculating large matrices such as A and B, or a cost of performing such calculation is relatively high, the matrix A may be divided into four fractal signal matrices, namely, A00, A01, A10, and A11, based on a condition, and the matrix B may be divided into four fractal weight matrices, namely, B00, B01, B10, and B11, based on a condition. A corresponding matrix C may include four matrix blocks: C00, C01, C10, and C11. A relationship between each matrix block in the matrix C and a fractal signal matrix and a fractal weight matrix may be shown by the following formulas:

$C00=A00B00+A01B10;$ $C01=A00B01+A01B11;$ $C10=A10B00+A11B10;$ and $C11=A10B01+A11B11.$ It can be learned from the foregoing formulas that one fractal signal matrix and one fractal weight matrix form one matrix multiplication, and each matrix block in the matrix C is obtained by accumulating operation results of two matrix multiplications. In specific implementation, data reusing may be implemented by adjusting an operation sequence of the eight matrix multiplications, thereby reducing power consumption. For example, if A00B00 is first calculated, and then A00B01 is calculated, A00 can be reused. For another example, if A00B00 is first calculated, and then A10B00 is calculated, B00 can be reused. It can be learned from this that an operation sequence of a plurality of matrix multiplications determines how data is reused in an operation process, and therefore affects performance such as a computing capability and power consumption of a processor.

In other approaches, an operation sequence of a plurality of matrix multiplications is usually determined based on a hit ratio of a cache such that data reusing is performed as much as possible. However, because an input matrix and a result matrix of a matrix multiplication may have different effects on processor performance, an operation sequence obtained only based on a cache hit ratio may not bring processor performance into full play.

SUMMARY

Embodiments of this application provide a signal processing method in order to resolve a technical problem that an operation sequence obtained only based on a cache hit ratio may not bring processor performance into full play.

According to a first aspect, an embodiment of this application provides a signal processing method, where the method includes receiving a signal matrix and a weight matrix, partitioning the signal matrix to obtain X×H fractal signal matrices, and partitioning the weight matrix to obtain H×Y fractal weight matrices, where the X×H fractal signal matrices and the H×Y fractal weight matrices form X×H×Y matrix multiplications, obtaining an operation sequence of the X×H×Y matrix multiplications, and processing the X×H×Y matrix multiplications based on the operation sequence of the X×H×Y matrix multiplications to obtain X×Y result matrices, where any one of the X×Y result matrices is obtained by accumulating operation results of at least two of the X×H×Y matrix multiplications, the operation sequence of the X×H×Y matrix multiplications is obtained based on performance parameters, and the performance parameters include power consumption of reading any one of the X×H fractal signal matrices from a first cache, power consumption of reading any one of the H×Y fractal weight matrices from a second cache, and power consumption of reading an operation result of any one of the X×H×Y matrix multiplications from a third cache, and outputting a signal processing result, where the signal processing result includes the X×Y result matrices.

It can be learned from the foregoing content that, because the power consumption of reading the any fractal signal matrix from the first cache, the power consumption of reading the any fractal weight matrix from the second cache, and the power consumption of reading the operation result of the any matrix multiplication from the third cache may be different, in this embodiment of this application, the operation sequence is determined based on the foregoing three types of power consumption. Compared with a solution in which the foregoing three types of power consumption are considered as the same and only a cache hit ratio is considered, this solution can reduce power consumption of a processor more effectively.

In a possible design, the operation sequence of the X×H×Y matrix multiplications is determined in the manner of selecting a first matrix multiplication from the X×H×Y matrix multiplications, and sequentially searching for a second matrix multiplication to an (X×H×Y)$^{th}$ matrix multiplication using the first matrix multiplication as a start point, to obtain the operation sequence, where the k$^{th}$ matrix multiplication is obtained through searching in the following manner selecting a matrix multiplication with a smallest cost value as the k$^{th}$ matrix multiplication based on a cost value of transiting from a (k−1)$^{th}$ matrix multiplication to any one of the X×H×Y matrix multiplications, where k is an integer greater than or equal to 2 and less than or equal to X×H×Y, and the k$^{th}$ matrix multiplication is a matrix multiplication in the X×H×Y matrix multiplications other than the first matrix multiplication to the (k−1)$^{th}$ matrix multiplication.

In the foregoing manner, in this embodiment of this application, the operation sequence can be quickly obtained through searching, and because the searching is performed based on a cost value of transiting from one matrix multiplication to another matrix multiplication, power consumption of a processor can be reduced more effectively using the obtained operation sequence.

In a possible design, a cost value of transiting from the (k−1)$^{th}$ matrix multiplication to an i$^{th}$ matrix multiplication is determined in the following manner, and the i$^{th}$ matrix multiplication is any one of the X×H×Y matrix multiplications:

$$Zi = E_{ai} + E_{bi} + 2E_{ci},$$

where Zi is the cost value of transiting from the (k−1)$^{th}$ matrix multiplication to the i$^{th}$ matrix multiplication, $E_{ai}$ is used to indicate power consumption of reading a fractal signal matrix of the i$^{th}$ matrix multiplication, $E_{bi}$ is used to indicate power consumption of reading a fractal weight matrix of the i$^{th}$ matrix multiplication, and $E_{ci}$ is used to indicate power consumption of reading an operation result of the i$^{th}$ matrix multiplication.

In a possible design, if the i$^{th}$ matrix multiplication reuses a fractal signal matrix of the (k−1)$^{th}$ matrix multiplication, $E_{ai}$ meets $E_{ai}=0$, or if the i$^{th}$ matrix multiplication does not reuse a fractal signal matrix of the (k−1)$^{th}$ matrix multiplication, $E_{ai}$ meets $E_{ai}=x1$, if the i$^{th}$ matrix multiplication reuses a fractal weight matrix of the (k−1)$^{th}$ matrix multiplication, $E_{bi}$ meets $E_{bi}=0$, or if the i$^{th}$ matrix multiplication does not reuse a fractal weight matrix of the (k−1)$^{th}$ matrix multiplication, $E_{bi}$ meets $E_{bi}=x2$, or if the i$^{th}$ matrix multiplication reuses an operation result of the (k−1)$^{th}$ matrix multiplication, $E_{ci}$ meets $E_{ci}=0$, or if the i$^{th}$ matrix multiplication does not reuse an operation result of the (k−1)$^{th}$ matrix multiplication, $E_{ci}$ meets $E_{ci}=x3$, where x1, x2, and x3 are all greater than 0.

In a possible design, the performance parameters further include bandwidth parameters, and the bandwidth parameters include a bandwidth penalty value of reading the any fractal signal matrix from the first cache, a bandwidth penalty value of reading the any fractal weight matrix from the second cache, and a bandwidth penalty value of reading the operation result of the any matrix multiplication from the third cache, and the bandwidth parameters are obtained based on read/write bandwidth of the first cache, read/write bandwidth of the second cache, and read/write bandwidth of the third cache.

It can be learned from the foregoing content that, in this embodiment of this application, during determining of the cost value of transiting from the (k−1)$^{th}$ matrix multiplication to the i$^{th}$ matrix multiplication, the operation sequence of the plurality of matrix multiplications is determined based on power consumption and bandwidth such that a computing capability of a processor can be better used and power consumption of the processor can be reduced using the operation sequence.

In a possible design, a cost value of transiting from the (k−1)$^{th}$ matrix multiplication to an i$^{th}$ matrix multiplication is determined in the following manner:

$$Zi = (E_{ai} + P_{ai}) + (E_{bi} + P_{bi}) + (2E_{ci} + 2P_{ci}),$$

where Zi is the cost value of transiting from the (k−1)$^{th}$ matrix multiplication to the i$^{th}$ matrix multiplication, $E_{ai}$ is used to indicate power consumption of reading a fractal signal matrix of the i$^{th}$ matrix multiplication from the first cache, $E_{bi}$ is used to indicate power consumption of reading a fractal weight matrix of the i$^{th}$ matrix multiplication from the second cache, $E_{ci}$ is used to indicate power consumption of reading an operation result of the i$^{th}$ matrix multiplication from the third cache, $P_{ai}$ is used to indicate a bandwidth penalty value of reading the fractal signal matrix of the i$^{th}$ matrix multiplication from the first cache, $P_{bi}$ is used to indicate a bandwidth penalty value of reading the fractal weight matrix of the i$^{th}$ matrix multiplication from the second cache, and $P_{ci}$ is used to indicate a bandwidth penalty value of reading the operation result of the i$^{th}$ matrix multiplication from the third cache.

In a possible design, if the i$^{th}$ matrix multiplication reuses a fractal signal matrix of the (k−1)$^{th}$ matrix multiplication, $E_{ai}$ meets $E_{ai}=0$, and $P_{ai}$ meets $P_{ai}=0$, or if the i$^{th}$ matrix multiplication does not reuse a fractal signal matrix of the (k−1)$^{th}$ matrix multiplication, $E_{ai}$ meets $E_{ai}=x1$, and $P_{ai}$ meets $P_{ai}=y1$, if the i$^{th}$ matrix multiplication reuses a fractal weight matrix of the (k−1)$^{th}$ matrix multiplication, $E_{bi}$ meets $E_{bi}=0$, and $P_{bi}$ meets $P_{bi}=0$, or if the i$^{th}$ matrix multiplication does not reuse a fractal weight matrix of the (k−1)$^{th}$ matrix multiplication, $E_{bi}$ meets $E_{bi}=x2$, and $P_{bi}$ meets $P_{bi}=y2$, or if the i$^{th}$ matrix multiplication reuses an operation result of the (k−1)$^{th}$ matrix multiplication, $E_{ci}$ meets $E_{ci}=0$, and $P_{ci}$ meets $P_{ci}=0$, or if the i$^{th}$ matrix multiplication does not reuse an operation result of the (k−1)$^{th}$ matrix multiplication, $E_{ci}$ meets $E_{ci}=x3$, and $P_{ci}$ meets $P_{ci}=y3$, where x1, x2, x3, y1, y2, and y3 are all greater than 0.

According to a second aspect, an embodiment of this application provides a signal processing apparatus, where the signal processing apparatus includes a transceiver module configured to receive a signal matrix and a weight matrix, a processing module configured to partition the signal matrix to obtain X×H fractal signal matrices, and partition the weight matrix to obtain H×Y fractal weight matrices, where the X×H fractal signal matrices and the H×Y fractal weight matrices form X×H×Y matrix multiplications, and obtain an operation sequence of the X×H×Y matrix multiplications, and process the X×H×Y matrix multiplications based on the operation sequence of the X×H×Y matrix multiplications to obtain X×Y result matrices, where any one of the X×Y result matrices is obtained by accumulating operation results of at least two of the X×H×Y matrix multiplications, the operation sequence of the X×H×Y matrix multiplications is obtained based on performance parameters, and the performance parameters include power consumption of reading any one of the X×H fractal signal matrices from a first cache, power consumption of reading any one of the H×Y fractal weight matrices from a second cache, and power consumption of reading an operation result of any one of the X×H×Y matrix multiplications from a third cache, and an output module configured to output a signal processing result, where the signal processing result includes the X×Y result matrices.

In a possible design, the processing module determines the operation sequence of the X×H×Y matrix multiplications in the manner of selecting a first matrix multiplication from the X×H×Y matrix multiplications, and sequentially searching for a second matrix multiplication to an $(X \times H \times Y)^{th}$ matrix multiplication using the first matrix multiplication as a start point, to obtain the operation sequence, where the $k^{th}$ matrix multiplication is obtained through searching in the manner of selecting a matrix multiplication with a smallest cost value as the $k^{th}$ matrix multiplication based on a cost value of transiting from a $(k-1)^{th}$ matrix multiplication to any one of the X×H×Y matrix multiplications, where k is an integer greater than or equal to 2 and less than or equal to X×H×Y, and the $k^{th}$ matrix multiplication is a matrix multiplication in the X×H×Y matrix multiplications other than the first matrix multiplication to the $(k-1)^{th}$ matrix multiplication.

In a possible design, the processing module determines, in the following manner, a cost value of transiting from the $(k-1)^{th}$ matrix multiplication to an $i^{th}$ matrix multiplication, and the $i^{th}$ matrix multiplication is any one of the X×H×Y matrix multiplications:

$$Zi = E_{ai} + E_{bi} + 2E_{ci},$$

where Zi is the cost value of transiting from the $(k-1)^{th}$ matrix multiplication to the $i^{th}$ matrix multiplication, $E_{ai}$ is used to indicate power consumption of reading a fractal signal matrix of the $i^{th}$ matrix multiplication, $E_{bi}$ is used to indicate power consumption of reading a fractal weight matrix of the $i^{th}$ matrix multiplication, and $E_{ci}$ is used to indicate power consumption of reading an operation result of the $i^{th}$ matrix multiplication.

In a possible design, if the $i^{th}$ matrix multiplication reuses a fractal signal matrix of the $(k-1)^{th}$ matrix multiplication, $E_{ai}$ meets $E_{ai}=0$, or if the $i^{th}$ matrix multiplication does not reuse a fractal signal matrix of the $(k-1)^{th}$ matrix multiplication, $E_{ai}$ meets $E_{ai}=x1$, if the $i^{th}$ matrix multiplication reuses a fractal weight matrix of the $(k-1)^{th}$ matrix multiplication, $E_{bi}$ meets $E_{bi}=0$, or if the $i^{th}$ matrix multiplication does not reuse a fractal weight matrix of the $(k-1)^{th}$ matrix multiplication, $E_{bi}$ meets $E_{bi}=x2$, or if the $i^{th}$ matrix multiplication reuses an operation result of the $(k-1)^{th}$ matrix multiplication, $E_{ci}$ meets $E_{ci}=0$, or if the $i^{th}$ matrix multiplication does not reuse an operation result of the $(k-1)^{th}$ matrix multiplication, $E_{ci}$ meets $E_{ci}=x3$, where x1, x2, and x3 are all greater than 0.

In a possible design, the performance parameters further include bandwidth parameters, and the bandwidth parameters include a bandwidth penalty value of reading the any fractal signal matrix from the first cache, a bandwidth penalty value of reading the any fractal weight matrix from the second cache, and a bandwidth penalty value of reading the operation result of the any matrix multiplication from the third cache, and the bandwidth parameters are obtained based on read/write bandwidth of the first cache, read/write bandwidth of the second cache, and read/write bandwidth of the third cache.

In a possible design, the processing module determines, in the following manner, a cost value of transiting from the $(k-1)^{th}$ matrix multiplication to an $i^{th}$ matrix multiplication:

$$Zi = (E_{ai} + P_{ai}) + (E_{bi} + P_{bi}) + (2E_{ci} + 2P_{ci}),$$

where Zi is the cost value of transiting from the $(k-1)^{th}$ matrix multiplication to the $i^{th}$ matrix multiplication, $E_{ai}$ is used to indicate power consumption of reading a fractal signal matrix of the $i^{th}$ matrix multiplication from the first cache, $E_{bi}$ is used to indicate power consumption of reading a fractal weight matrix of the $i^{th}$ matrix multiplication from the second cache, $E_{ci}$ is used to indicate power consumption of reading an operation result of the $i^{th}$ matrix multiplication from the third cache, $P_{ai}$ is used to indicate a bandwidth penalty value of reading the fractal signal matrix of the $i^{th}$ matrix multiplication from the first cache, $P_{bi}$ is used to indicate a bandwidth penalty value of reading the fractal weight matrix of the $i^{th}$ matrix multiplication from the second cache, and $P_{ci}$ is used to indicate a bandwidth penalty value of reading the operation result of the $i^{th}$ matrix multiplication from the third cache.

In a possible design, if the $i^{th}$ matrix multiplication reuses a fractal signal matrix of the $(k-1)^{th}$ matrix multiplication, $E_{ai}$ meets $E_{ai}=0$, and $P_{ai}$ meets $P_{ai}=0$, or if the $i^{th}$ matrix multiplication does not reuse a fractal signal matrix of the $(k-1)^{th}$ matrix multiplication, $E_{ai}$ meets $E_{ai}=x1$, and $P_{ai}$ meets $P_{ai}=y1$, if the $i^{th}$ matrix multiplication reuses a fractal weight matrix of the $(k-1)^{th}$ matrix multiplication, $E_{bi}$ meets $E_{bi}=0$, and $P_{bi}$ meets $P_{bi}=0$, or if the $i^{th}$ matrix multiplication does not reuse a fractal weight matrix of the $(k-1)^{th}$ matrix multiplication, $E_{bi}$ meets $E_{bi}=x2$, and $P_{bi}$ meets $P_{bi}=y2$, or if the $i^{th}$ matrix multiplication reuses an operation result of the $(k-1)^{th}$ matrix multiplication, $E_{ci}$ meets $E_{ci}=0$, and $P_{ci}$ meets $P_{ci}=0$, or if the $i^{th}$ matrix multiplication does not reuse an operation result of the $(k-1)^{th}$ matrix multiplication, $E_{ci}$ meets $E_{ci}=x3$, and $P_{ci}$ meets $P_{ci}=y3$, where x1, x2, x3, y1, y2, and y3 are all greater than 0.

An embodiment of this application further provides a signal processing apparatus, and the signal processing apparatus includes a memory configured to store a software program, and a processor configured to read the software program in the memory and perform the signal processing method according to the foregoing aspects or possible designs.

An embodiment of this application further provides a computer storage medium. The storage medium stores a software program. When the software program is read and executed by one or more processors, the signal processing method according to the foregoing aspects or possible designs can be implemented.

An embodiment of this application further provides a computer program product including an instruction. When the computer program product is run on a computer, the computer is enabled to perform the signal processing method according to the foregoing aspects or possible designs.

An embodiment of this application further provides a computer program. When the computer program is run on a computer, the computer is enabled to perform the signal processing method according to the foregoing aspects or possible designs.

BRIEF DESCRIPTION OF DRAWINGS

FIG. 6 is a schematic diagram of a matrix multiplication according to an embodiment of this application;

DESCRIPTION OF EMBODIMENTS

The following describes this application with reference to accompanying drawings of the specification. A specific operation method in a method embodiment may also be applied to an apparatus embodiment or a system embodiment.

Figures 1, 2:
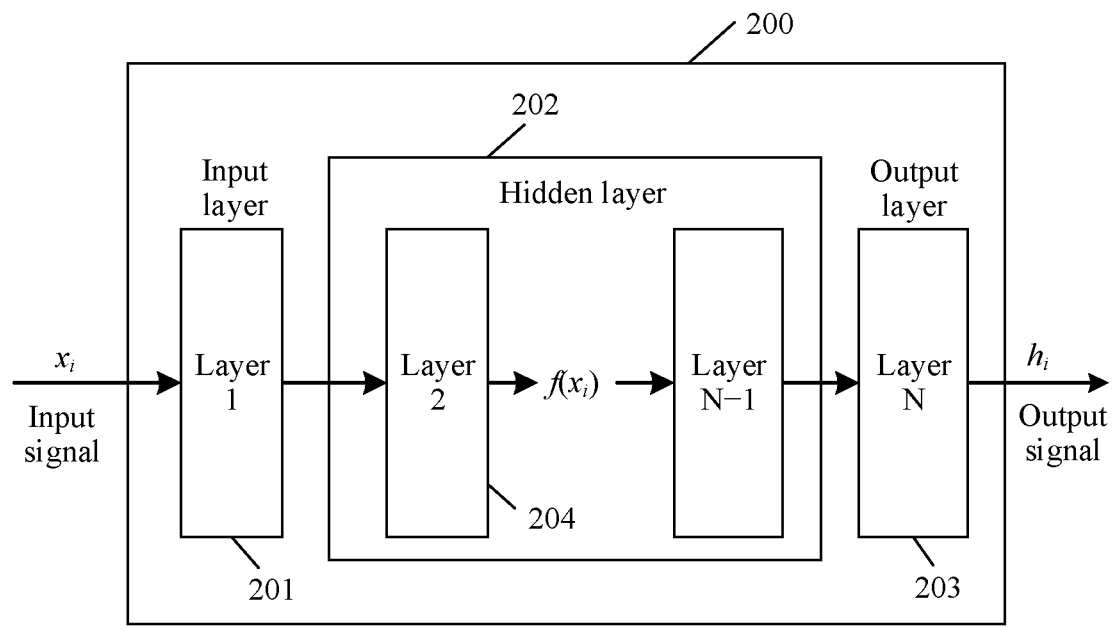
FIG. 1 is a schematic diagram of matrix partitioning.
FIG. 2 is a schematic structural diagram of a NN.

FIG. 2 is a schematic structural diagram of an NN 200. The NN 200 has N processing layers, N≥3, and N is a natural number. The first layer of the NN is an input layer 201, and is responsible for receiving an input signal. The last layer of the NN is an output layer 203, and is responsible for outputting a processing result of the NN. Other layers than the first layer and the last layer are intermediate layers 204. These intermediate layers jointly constitute a hidden layer 202. Each intermediate layer in the hidden layer can receive an input signal and output a signal, and the hidden layer is responsible for an input-signal processing process. Each layer represents a logical level of signal processing. Through a plurality of layers, a data signal can be processed at a plurality of logical levels.

For ease of understanding, the following describes a processing principle of an NN in an embodiment of this application. Processing of the NN is usually a non-linear function $f(x_i)$, for example, $f(x_i)=\max(0,x_i)$. In some feasible embodiments, the processing function may be a rectified linear unit (ReLU), a hyperbolic tangent function (tan h), a sigmoid function (sigmoid), or the like. It is assumed that $(x_1,x_2,x_3)$ is a one-dimensional signal matrix, $(h_1,h_2,h_3)$ is an output signal matrix, $W_{ij}$ denotes a weight coefficient between input $x_j$ and output $h_i$, and a matrix that includes a weight coefficient is a weight matrix. In this case, a weight matrix W corresponding to the one-dimensional signal matrix and the output signal matrix is shown by formula (1):

$$W = \begin{pmatrix} W_{11} & W_{12} & W_{13} \\ W_{21} & W_{22} & W_{23} \\ W_{31} & W_{32} & W_{33} \end{pmatrix}. \quad (1)$$

A relationship between an input signal and an output signal is shown by formula (2), where $b_i$ is an offset value of an NN processing function, and the offset value is used to adjust input of the NN to obtain an ideal output result.

$$h_1=f(W_{11}x_1+W_{12}x_2+W_{13}x_3+b_1)$$

$$h_2=f(W_{21}x_1+W_{22}x_2+W_{23}x_3+b_2)$$

$$h_3=f(W_{31}x_1+W_{32}x_2+W_{33}x_3+b_3) \quad (2).$$

In some feasible embodiments, input signals of the NN may be signals in various forms such as a voice signal, a text signal, an image signal, and a temperature signal. The voice signal may be a voice signal recorded by a recording device, a voice signal received by a mobile phone or a fixed-line phone in a call process, a voice signal that is sent by a radio station and that is received by a radio, or the like. The text signal may be a TXT text signal, a Word text signal, a Portable Document Format (PDF) text signal, or the like. The image signal may be a scene signal photographed by a camera, an image signal of a community environment captured by a display monitoring device, a face signal of a human face obtained by an access control system, or the like. The input signals of the NN include various other engineering signals that can be processed by a computer, which are not listed herein. Processing performed by the hidden layer 202 of the NN may be processing such as removing a noise signal from a voice signal to enhance the voice signal, understanding specific content in a text signal, and performing recognition on a face image signal of a human face.

Figure 3:
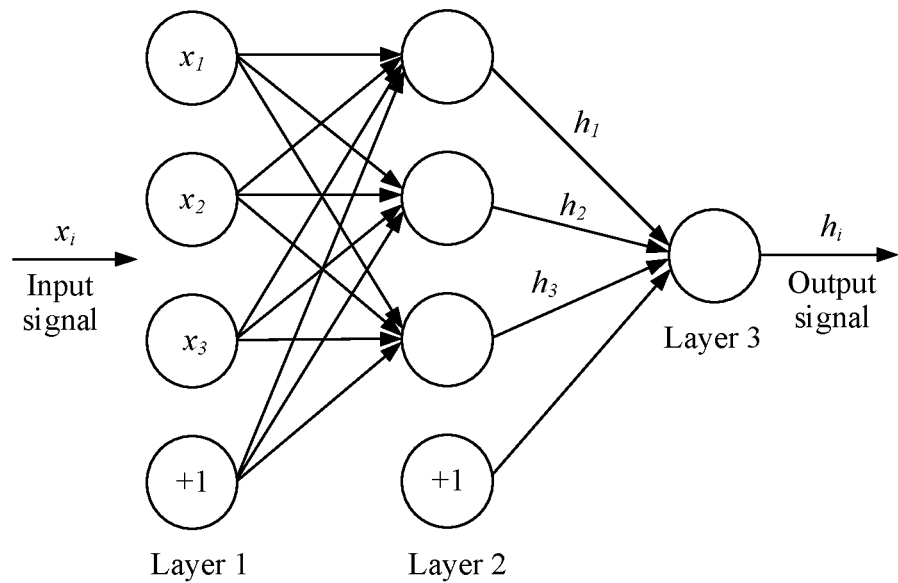
FIG. 3 is a schematic structural diagram of a fully connected NN.

Each layer of the NN may include a plurality of nodes, and the node may be referred to as a neuron. A fully connected NN is a NN in which neurons are fully connected between adjacent layers, to be specific, all neurons in a layer are connected to each neuron in a next layer. For example, FIG. 3 is a schematic structural diagram of a fully connected NN that includes three layers. "+1" in FIG. 3 represents an offset neuron that is configured to adjust input at each layer of the NN. Because neurons at adjacent layers of a fully connected network are fully connected, when there are a relatively large quantity of intermediate layers in the fully connected NN, a signal matrix and a weight matrix have larger dimensions at a processing layer that is more rearward, and consequently, a network size of the NN is excessively large.

Figure 4:
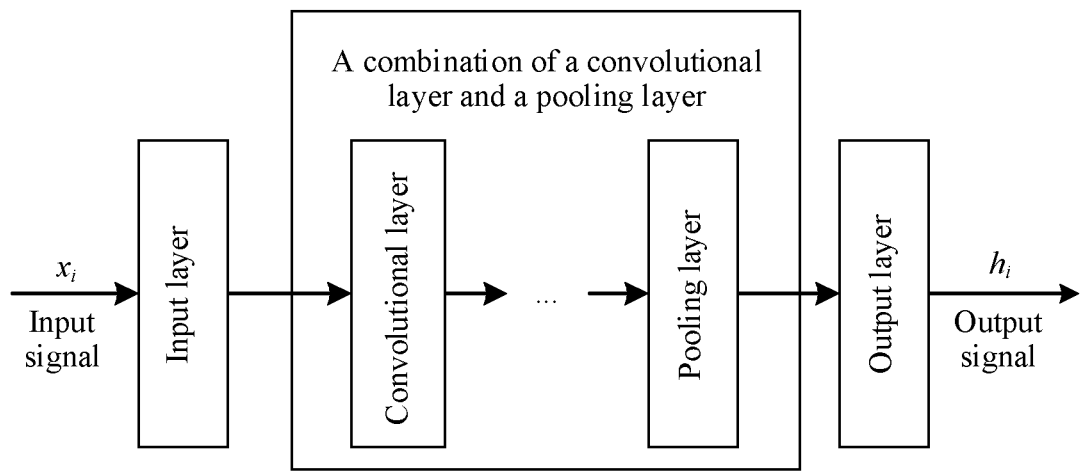
FIG. 4 is a schematic structural diagram of a CNN.

In a CNN, a relatively small parameter template can be used to slide filtering in an input signal spatial domain, thereby resolving a problem that a network size of a fully connected NN is excessively large. A difference between the CNN and a common NN is that the CNN includes a feature extractor including a convolutional layer and a sub sampling layer. At the convolutional layer of the CNN, one neuron is connected only to some of neurons at a neighboring layer. One convolutional layer of the CNN usually includes feature planes. Each feature plane includes some neurons in a rectangular arrangement. Neurons in a same feature plane share a weight, and the shared weight herein is a convolution kernel. The convolution kernel is usually initialized in a form of a random decimal matrix. In a network training process, the convolution kernel obtains a proper weight through learning. A direct benefit brought by the convolution kernel is that connections between layers of the network are reduced. Sub sampling is also referred to as pooling. Sub sampling may be considered as a special convolution process. Convolution and sub sampling greatly reduce model complexity and reduce a quantity of model parameters. As shown in FIG. 4, a CNN includes three parts. A first part is an input layer, a second part includes a combination of n convolutional layers and a pooling layer, and a third part is an output layer. The output layer may include a fully connected multi-layer perceptron classifier.

The convolutional layer in the CNN may be used to perform a convolution operation on an input signal array and a weight array. A one-dimensional input signal is used herein as an example. Assuming that the input signal is $f(u)$, $u=0\sim N-1$, and a convolution kernel is $h(v)$, $v=0\sim n-1$, $n\leq N$, a convolution operation may be described using the following formula (3):

$$y(i) = \sum_{u=0}^{N-1} f(u)h(i-u), \, i=0\sim N+n-1. \quad (3)$$

Figure 5:
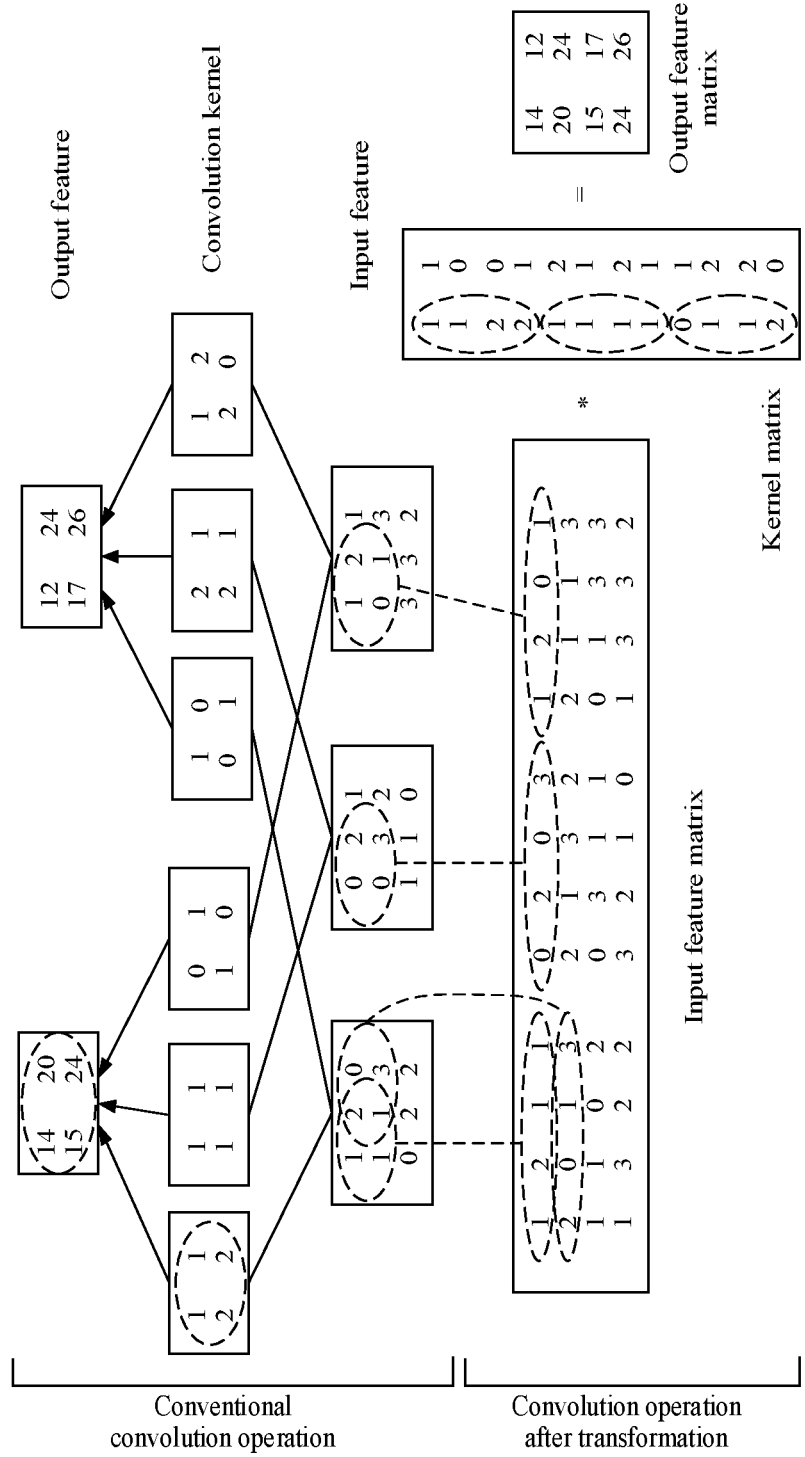
FIG. 5 is a schematic diagram of a convolution operation in a CNN.

A CNN may be widely applied to speech recognition, face recognition, general object recognition, motion analysis, image processing, and the like. For example, an input signal is a two-dimensional matrix. As shown in FIG. 5, it is assumed that an input feature corresponding to an image at a convolutional layer includes three three-row three-column signal matrices, and a convolution kernel includes six two-row two-column weight matrices. FIG. 5 shows two specific operation manners for performing a convolution operation in a CNN. One is a conventional convolution operation, and the other is a convolution operation after matrix transformation. The conventional convolution operation is to perform a matrix multiplication operation on each signal matrix and a weight matrix corresponding to the signal matrix, and accumulate results of corresponding matrix multiplication operations to obtain two output signal matrices, that is, an output feature. In the convolution operation after matrix transformation, different signal matrices are converted to obtain an input feature matrix that includes three signal matrices and has a relatively large matrix dimension. Similarly, a corresponding conversion operation is also performed on the six weight matrices to obtain a kernel matrix that includes six weight matrices and has a relatively large matrix dimension. Then, a matrix multiplication operation is performed on the input feature matrix and the kernel matrix that are obtained through transformation, to obtain an output feature matrix.

Through matrix transformation of the signal matrix and the weight matrix, a quantity of matrix multiplication operation times can be reduced in order to reduce overheads of reading the signal matrix and the weight matrix. However, calculation overheads required for a matrix multiplication operation after transformation are relatively high, and therefore, the signal matrix and the weight matrix need to be separately partitioned. Partitioning a matrix means dividing the matrix into a plurality of sub-blocks, and each sub-block may be referred to as a fractal matrix. There is a correspondence between a plurality of fractal signal matrices and a plurality of fractal weight matrices obtained through partitioning. A fractal signal matrix and a fractal weight matrix corresponding to the fractal signal matrix meet a matrix multiplication rule. The matrix multiplication rule is that a quantity of columns of the first matrix that participates in a matrix multiplication is equal to a quantity of rows of the second matrix that participates in the matrix multiplication.

When there are a relatively large quantity of fractal signal matrices and fractal weight matrices obtained through partitioning, there are a relatively large quantity of matrix multiplications formed by the fractal signal matrices and the fractal weight matrices. Referring to FIG. 6, it is assumed that a left matrix (signal matrix) A and a right matrix (weight matrix) B in a matrix multiplication are the same in size, each small block in the signal matrix represents one fractal signal matrix, and there are 64 (8×8) fractal signal matrices in total, each small block in the weight matrix represents one fractal weight matrix, and there are 64 (8×8) fractal weight matrices in total. The fractal signal matrices and the fractal weight matrices form 8×8×8=512 matrix multiplications, for example, A00×B00, A00×B01, A10×B00, and A01×B01. The matrix multiplication of the fractal signal matrix and the fractal weight matrix may be represented as Ax,h×Ah,y. Therefore, each matrix multiplication formed by a fractal signal matrix and a fractal weight matrix may be described as a point (x, h, y) in three-dimensional space. In this way, determining an operation sequence of a plurality of matrix multiplications is equivalent to searching for an operation sequence in a graph with 8×8×8 vertices in three-dimensional space such that processor performance is optimal in a measurement dimension.

In the other approaches, an operation sequence of a plurality of matrix multiplications is usually determined based on a hit ratio of a cache, to be specific, it is considered that an input matrix and a result matrix of a matrix multiplication have a same effect on processor performance such that an operation sequence that makes the cache hit ratio highest is selected for performing an operation on the plurality of matrix multiplications.

However, in some processors, an input matrix and a result matrix may be separately stored in different caches, and bandwidth capabilities and power consumption thereof may be different. Therefore, an operation sequence obtained only based on a cache hit ratio may not bring processor performance into full play.

Based on this, embodiments of this application provide a signal processing method in order to resolve a technical problem in the other approaches that an operation sequence obtained only based on a cache hit ratio may not bring processor performance into full play.

Figure 7A:
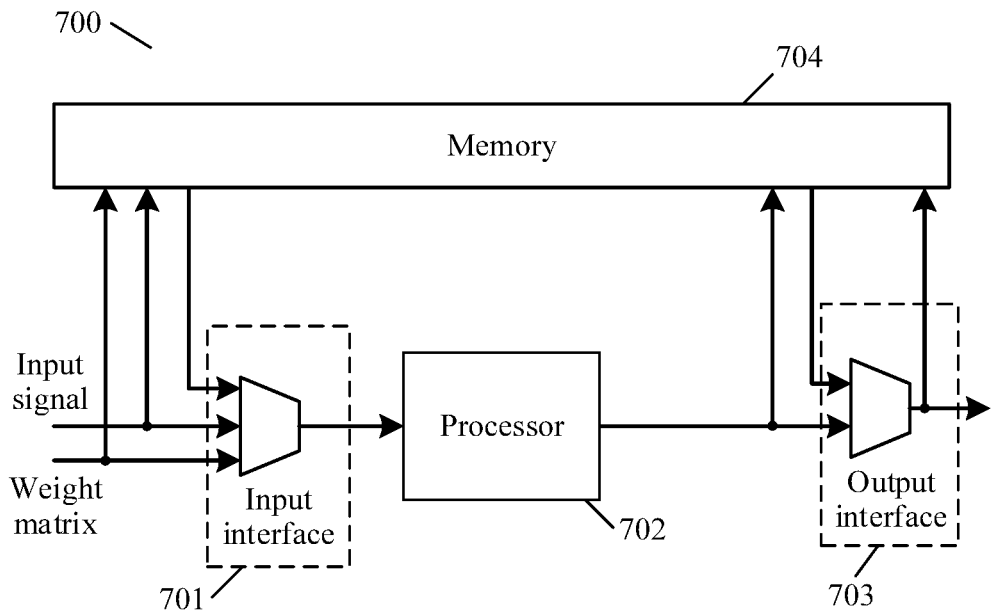
FIG. 7A is a schematic structural diagram of a signal processing apparatus to which an embodiment of this application is applied.

FIG. 7A is a schematic structural diagram of an apparatus to which an embodiment of this application is applied. Referring to FIG. 7A, the signal processing apparatus may include an input interface 701. The input interface is configured to receive a signal matrix and/or a weight matrix, and the input interface may use a selector to implement switching between signal matrix reception and weight matrix reception. In some feasible embodiments, the input interface may receive the foregoing signal matrix or weight matrix in a time division multiplexing manner. In some feasible embodiments, there may be two input interfaces for respectively receiving the signal matrix and the weight matrix, for example, the signal matrix and the weight matrix may be simultaneously received.

The signal processing apparatus may further include a processor 702 configured to have a function of performing processing of the signal processing method in the embodiments of this application. In some feasible embodiments, the processor may be of a single-processor structure, of a multi-processor structure, a single-thread processor, a multi-thread processor, or the like. In some feasible embodiments, the processor may be integrated into an application-specific integrated circuit, or may be a processor chip independent of an integrated circuit.

The signal processing apparatus may further include an output interface 703 configured to output a signal processing result in the foregoing signal processing method. In some feasible embodiments, the signal processing result may be directly output by the processor, or may be first stored in a memory and then output using the memory. In some feasible embodiments, there may be only one output interface, or there may be a plurality of output interfaces. In some feasible embodiments, the signal processing result output through the output interface may be sent to a memory for storage, or may be sent to a next signal processing apparatus for further processing, or may be sent to a display device for display or a player terminal for play, or the like.

The signal processing apparatus 700 may further include a memory 704 that may store the foregoing signal matrix, the signal processing result, the weight matrix, a related instruction for processor configuration, and the like. In some feasible embodiments, there may be one memory, or there may be a plurality of memories. The memory may be a floppy disk, a hard disk such as a built-in hard disk or a removable hard disk, a magnetic disk, an optical disc, a magneto-optical disc, a flash memory, or a storage medium in any other form known in the art.

Figure 7B:
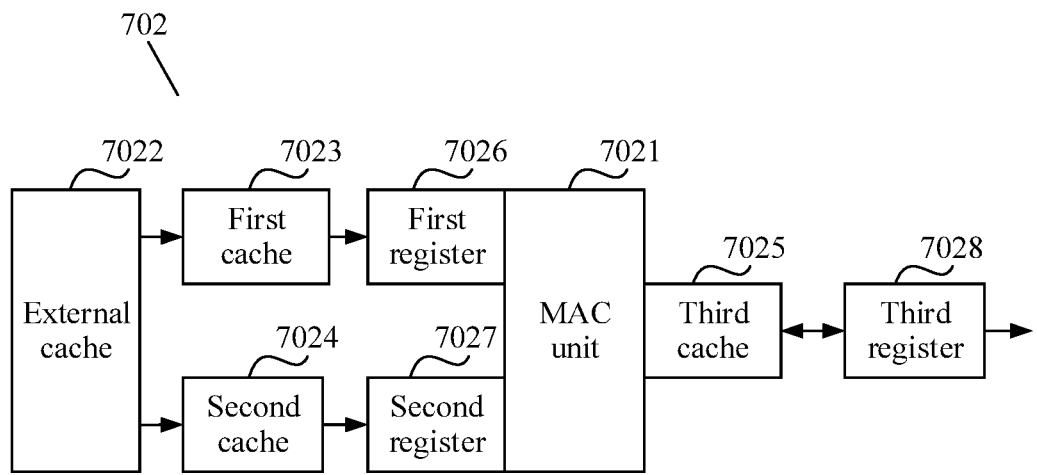
FIG. 7B is a schematic structural diagram of a processor to which an embodiment of this application is applied.

Further, referring to FIG. 7B, the processor 702 may include a multiplication-accumulation (MAC) unit 7021, an external cache 7022, a first cache 7023, a second cache 7024, a third cache 7025, a first register 7026, a second register 7027, and a third register 7028. The MAC unit 7021 is configured to perform a specific multiply-add operation. The external cache 7022 may be configured to store the signal matrix and the weight matrix. The first cache 7023 and the first register 7026 may be configured to store a fractal signal matrix of the signal matrix. The second cache 7024 and the second register 7027 may be configured to store a fractal weight matrix of the weight matrix. The third cache 7025 and the third register 7028 may be configured to store an operation result of a matrix multiplication. The MAC unit 7021 may directly interact with the first cache 7023, the second cache 7024, the third cache 7025, the first register 7026, the second register 7027, and the third register 7028.

A matrix multiplication operation shown in FIG. 1 is used as an example. Calculation of each matrix block (result matrix) of a matrix C may be performed in two steps. For example, C00 may be performed according to the following steps (I) and (II):

$$C00\_temp = A00B00 \quad (I),$$

$$C00 = C00\_temp + A01B10 \quad (II).$$

In step (I), when performing a matrix multiplication operation on a fractal signal matrix A00 and a fractal weight matrix B00, the MAC unit 7021 may first attempt to read A00 from the first register 7026, and read A00 from the first cache 7023 if A00 is not in the first register 7026. Similarly, the MAC unit 7021 may first attempt to read B00 from the second register 7027, and read B00 from the second cache 7024 if B00 is not in the second register 7027. Then, the MAC unit 7021 performs a matrix multiplication operation on A00 and B00 to obtain a matrix multiplication operation result C00_temp (a first operation result), and writes the matrix multiplication operation result C00_temp into the third register 7028. The matrix multiplication operation result in this embodiment of this application is obtained by multiplying the fractal signal matrix and the fractal weight matrix, and therefore may also be referred to as a fractal result matrix.

In step (II), when performing a matrix multiplication operation on a fractal signal matrix A01 and a fractal weight matrix B10, the MAC unit 7021 reads A01 and B10 in the same manner, performs the matrix multiplication operation to obtain a matrix multiplication operation result (a second operation result), and may directly read the first operation result C00_temp from the third register 7028. The MAC unit 7021 adds the first operation result and the second operation result to obtain a result matrix C00, and writes C00 into the third register 7028.

It can be learned from this that C00_temp is reused during calculation of C00, thereby effectively reducing a read/write amount of C00_temp. This reduces a bandwidth requirement of a processor and reduces read/write power consumption of a memory.

Figure 8:
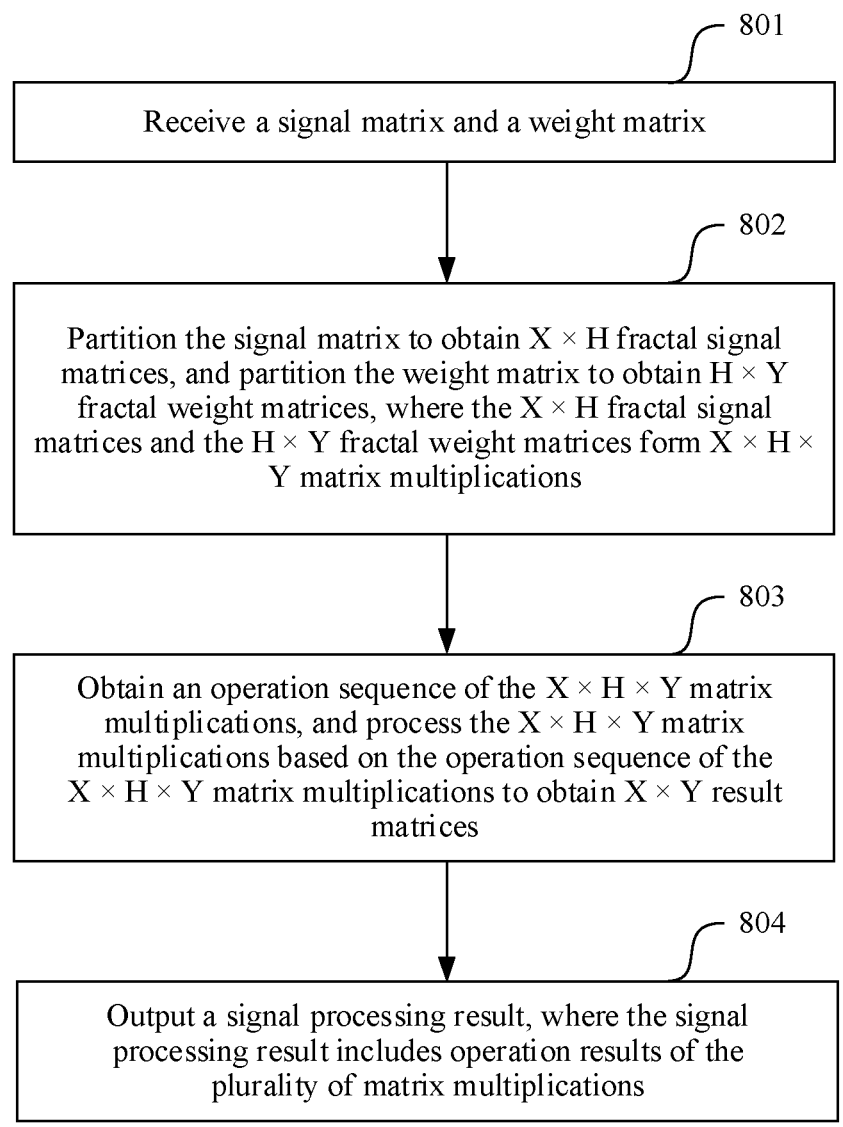
FIG. 8 is a schematic flowchart corresponding to a signal processing method according to an embodiment of this application.

Based on the foregoing descriptions, FIG. 8 is a schematic flowchart corresponding to a signal processing method according to an embodiment of this application. As shown in FIG. 8, the method includes the following steps.

Step 801: Receive a signal matrix and a weight matrix.

Herein, the signal matrix may be from an input layer of an NN or a previous intermediate layer of an intermediate layer at which signal processing is performed, and an input signal may be any signal that can be collected and processed, such as a voice signal, a text signal, an image signal, or a temperature signal. The signal matrix may be a matrix not converted, or may be a converted matrix. The signal matrix may be a two-dimensional matrix of M rows and K columns, and the matrix includes a plurality of to-be-processed signals that can be processed by a computer, that is, each element corresponds to one signal. When the signal matrix is a converted matrix, a matrix from which the signal matrix is converted may be a one-dimensional column vector, a one-dimensional row vector, a two-dimensional matrix (such as a grayscale image), a three-dimensional matrix (such as a red, green, and blue (RGB) color image), or the like. This is not limited in this embodiment of this application.

The weight matrix may include a plurality of weight coefficients. The weight matrix may be defined by the NN. The weight coefficient acts on the input signal. An input signal corresponding to a large weight coefficient is enhanced in a process of learning and training of the NN, and an input signal corresponding to a small weight coefficient is weakened in a process of learning and training of the NN. The weight matrix may be a weight matrix not converted, or may be a converted weight matrix, and is a two-dimensional weight matrix of K rows and N columns.

Step 802 Partition the signal matrix to obtain X×H fractal signal matrices, and partition the weight matrix to obtain H×Y fractal weight matrices, where the X×H fractal signal matrices and the H×Y fractal weight matrices form X×H×Y matrix multiplications.

Herein, the partitioning the signal matrix to obtain X×H fractal signal matrices means partitioning the signal matrix into X rows and H columns, where any row includes H fractal signal matrices, and any column includes X fractal signal matrices. The partitioning the weight matrix to obtain H×Y fractal weight matrices means partitioning the weight matrix into H rows and Y columns, where any row includes Y fractal weight matrices, and any column includes H fractal weight matrices.

Example 1

Figure 9A:
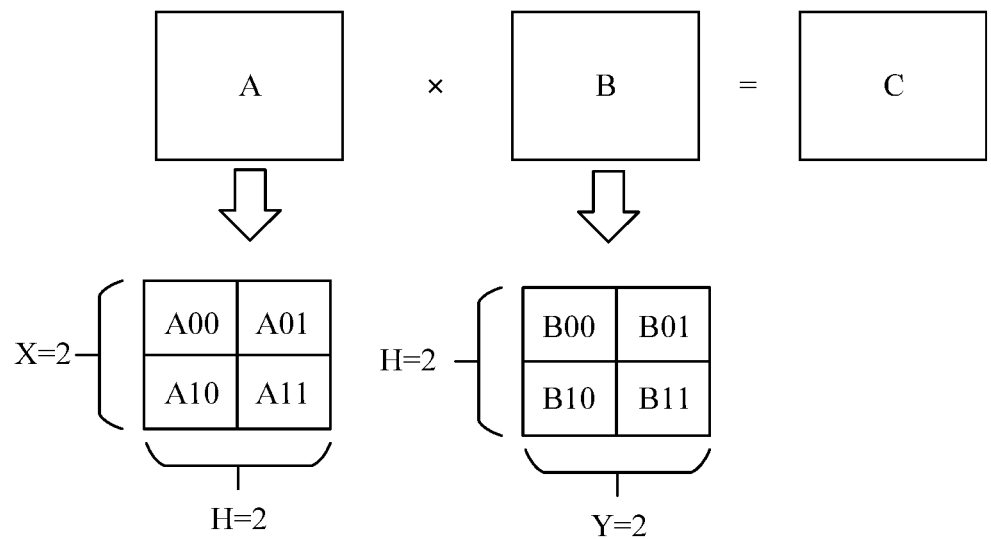
FIG. 9A is a schematic diagram of quantities of fractal signal matrices and fractal weight matrices.

Referring to FIG. 9A, a signal matrix A is partitioned to obtain 2×2 (X=2 and H=2) fractal signal matrices, and a weight matrix B is partitioned to obtain 2×2 (H=2 and Y=2) fractal weight matrices. In this case, 8 (2×2×2) matrix multiplication operations need to be performed to calculate a matrix C, that is, four fractal signal matrices and four fractal weight matrices form eight matrix multiplications.

Example 2

Figure 9B:
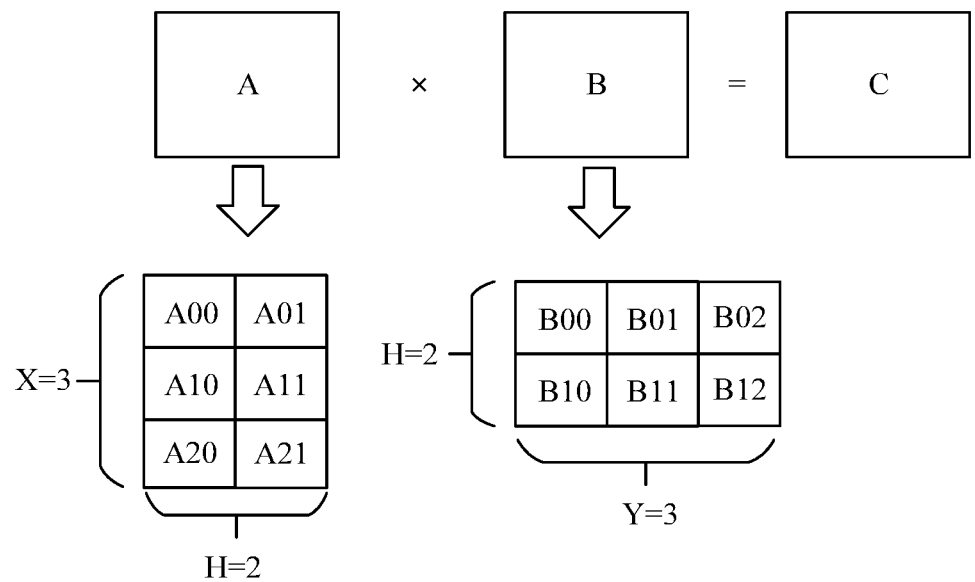
FIG. 9B is another schematic diagram of quantities of fractal signal matrices and fractal weight matrices.

Referring to FIG. 9B, a signal matrix A is partitioned to obtain 3×2 (X=3 and H=2) fractal signal matrices, and a weight matrix B is partitioned to obtain 2×3 (H=2 and Y=3) fractal weight matrices. In this case, 18 (3×2×3) matrix multiplication operations need to be performed to calculate a matrix C, that is, six fractal signal matrices and six fractal weight matrices form 18 matrix multiplications.

Step 803: Obtain an operation sequence of the X×H×Y matrix multiplications, and process the X×H×Y matrix multiplications based on the operation sequence of the X×H×y matrix multiplications to obtain X×Y result matrices, where any one of the X×Y result matrices is obtained by accumulating operation results of at least two of the X×H×Y matrix multiplications.

Herein, the operation sequence of the X×H×Y matrix multiplications is used to indicate a sequence in which a MAC unit calculates the X×H×Y matrix multiplications. The operation sequence may be represented in a plurality of forms, such as a data table. Refer to Table 1.

TABLE 1

Example of the operation sequence of the X × H × Y matrix multiplications

| Sequence number | Address information of a fractal signal matrix | Address information of a fractal weight matrix |
| --- | --- | --- |
| 1 | Address information of A00 | Address information of B00 |
| 2 | Address information of A10 | Address information of B00 |
| 3 | Address information of A01 | Address information of B10 |
| ... | ... | ... |
| X × H × Y | ******** | ******** |

In Table 1, the sequence number is used to indicate a sequence. In specific implementation, the MAC unit may perform an operation on each matrix multiplication based on a sequence of sequence numbers. The address information of the fractal signal matrix may be location information of the fractal signal matrix in the signal matrix. For example, the address information of the fractal signal matrix may be represented using coordinates of the fractal signal matrix in the signal matrix. Referring to FIG. 6, coordinates corresponding to each small block in the matrix A are address information of a fractal signal matrix, for example, (0, 0) is address information of a fractal signal matrix 1, and (0, 1) is address information of a fractal signal matrix 2. The address information of the fractal weight matrix may be location information of the fractal weight matrix in the weight matrix. For details, refer to the address information of the fractal signal matrix. Details are not described again.

It should be noted that Table 1 is only an example. In another embodiment, the address information of the fractal signal matrix and the address information of the fractal weight matrix may be listed merely in sequence with no sequence numbers, or another possible form may be used, provided that the operation sequence of the matrix multiplications can be effectively indicated. This is not limited in this application.

In this embodiment of this application, the operation sequence of the X×H×Y matrix multiplications is obtained based on performance parameters. The performance parameters include power consumption of reading any one of the X×H fractal signal matrices from a first cache, power consumption of reading any one of the H×Y fractal weight matrices from a second cache, and power consumption of reading an operation result of any one of the X×H×Y matrix multiplications from a third cache. Further, the performance parameters may further include bandwidth parameters. The bandwidth parameters include a bandwidth penalty value of reading the any fractal signal matrix from the first cache, a bandwidth penalty value of reading the any fractal weight matrix from the second cache, and a bandwidth penalty value of reading the operation result of the any matrix multiplication from the third cache. In this way, the operation sequence of the plurality of matrix multiplications is determined based on power consumption and bandwidth such that a computing capability of a processor can be better used and power consumption of the processor can be reduced using the operation sequence.

The following further describes a manner of determining the operation sequence based on the performance parameters.

In an example, the operation sequence of the X×H×Y matrix multiplications may be determined in the manner of selecting a first matrix multiplication from the X×H×Y matrix multiplications, and sequentially searching for a second matrix multiplication to an $(X \times H \times Y)^{th}$ matrix multiplication using the first matrix multiplication as a start point, to obtain the operation sequence, where the $k^{th}$ matrix multiplication is obtained through searching in the manner of selecting a matrix multiplication whose cost value is less than a first threshold, based on a cost value of transiting from a $(k-1)^{th}$ matrix multiplication to any one of the X×H×Y matrix multiplications, to obtain the $k^{th}$ matrix multiplication, where k is an integer greater than or equal to 2 and less than or equal to X×H×Y, and the $k^{th}$ matrix multiplication is a matrix multiplication in the X×H×Y matrix multiplications other than the first matrix multiplication to the $(k-1)^{th}$ matrix multiplication.

The following describes a calculation manner of a cost value of transiting from the $(k-1)^{th}$ matrix multiplication to an $i^{th}$ matrix multiplication (the $i^{th}$ matrix multiplication is any one of the X×H×Y matrix multiplications).

(x, h, y) represents one of the X×H×Y matrix multiplications. Transition from the $(k-1)^{th}$ matrix multiplication to the $i^{th}$ matrix multiplication may be represented as transition from $(x_{k-1}, h_{k-1}, y_{k-1})$ to $(x_i, h_i, y_i)$, that is, the MAC unit first calculates $(x_{k-1}, h_{k-1}, y_{k-1})$ and then calculates $(x_i, h_i, y_i)$.

In a possible implementation, the cost value is determined based on power consumption of different caches. In this manner, a cost function of transiting from the $(k-1)^{th}$ matrix multiplication to the $i^{th}$ matrix multiplication is as follows:

$$Z_i = E_{ai} + E_{bi} + E_{ci},$$

where $Z_i$ is the cost value of transiting from the $(k-1)^{th}$ matrix multiplication to the $i^{th}$ matrix multiplication, $E_{ai}$ is used to indicate power consumption of reading a fractal signal matrix of the $i^{th}$ matrix multiplication, $E_{bi}$ is used to indicate power consumption of reading a fractal weight matrix of the $i^{th}$ matrix multiplication, and $E_{ci}$ is used to indicate power consumption of reading an operation result of the $i^{th}$ matrix multiplication.

Further, if the $i^{th}$ matrix multiplication reuses a fractal signal matrix of the $(k-1)^{th}$ matrix multiplication (in this case, $x_{i-1}$ meets $x_{i-1} = x_i$, and $h_{i-1}$ meets $h_{i-1} = h_i$), $E_{ai}$ meets $E_{ai} = 0$, or if the $i^{th}$ matrix multiplication does not reuse a fractal signal matrix of the $(k-1)^{th}$ matrix multiplication, $E_{ai}$ meets $E_{ai}$=x1, if the $i^{th}$ matrix multiplication reuses a fractal weight matrix of the $(k-1)^{th}$ matrix multiplication (in this case, $h_{i-1}$ meets $h_{i-1}$=$h_i$, and $y_{i-1}$ meets $y_{i-1}$=$y_i$), $E_{bi}$ meets $E_{bi}$=0, or if the $i^{th}$ matrix multiplication does not reuse a fractal weight matrix of the $(k-1)^{th}$ matrix multiplication, $E_{bi}$ meets $E_{bi}$=x2, or if the $i^{th}$ matrix multiplication reuses an operation result of the $(k-1)^{th}$ matrix multiplication (in this case, $x_{i-1}$ meets $x_{i-1}$=$x_i$, and $y_{i-1}$ meets $y_{i-1}$=$y_i$), $E_{ci}$ meets $E_{ci}$=0, or if the $i^{th}$ matrix multiplication does not reuse an operation result of the $(k-1)^{th}$ matrix multiplication, $E_{ci}$ meets $E_{ci}$=x3.

x1, x2, and x3 are all greater than 0. In an example, x1:x2:x3=v1:v2:v3, where v1 is the power consumption of reading the any fractal signal matrix from the first cache, v2 is the power consumption of reading the any fractal weight matrix from the second cache, and v3 is the power consumption of reading the operation result of the any matrix multiplication from the third cache.

To be specific, x1, x2, and x3 may be respectively the power consumption of reading the any fractal signal matrix from the first cache, the power consumption of reading the any fractal weight matrix from the second cache, and the power consumption of reading the operation result of the any matrix multiplication from the third cache, or may be a group of proportional values obtained based on the power consumption of reading the any fractal signal matrix from the first cache, the power consumption of reading the any fractal weight matrix from the second cache, and the power consumption of reading the operation result of the any matrix multiplication from the third cache.

It can be learned from the foregoing content that, because the power consumption of reading the any fractal signal matrix from the first cache, the power consumption of reading the any fractal weight matrix from the second cache, and the power consumption of reading the operation result of the any matrix multiplication from the third cache may be different, in this embodiment of this application, the cost value of transiting from $(x_{i-1}, h_{i-1}, y_{i-1})$ to $(x_i, h_i, y_i)$ is determined based on the foregoing three types of power consumption, and then the operation sequence is determined. Compared with a solution in which the foregoing three types of power consumption are considered as the same and only a cache hit ratio is considered, this solution can reduce power consumption of a processor more effectively.

In another possible implementation, read/write bandwidth of the first cache, read/write bandwidth of the second cache, and read/write bandwidth of the third cache may also be different. For example, the read/write bandwidth of the first cache is 50 megabits per second (mb/s), the read/write bandwidth of the second cache is 100 mb/s, and the read/write bandwidth of the third cache is 100 mb/s. Because the read/write bandwidth of the first cache is less than the read/write bandwidth of the second cache and the read/write bandwidth of the third cache, reusing the fractal signal matrix as much as possible can bring a computing capability of a processor into full play. Based on this, bandwidth parameters are introduced in this embodiment of this application, and the bandwidth parameters include a bandwidth penalty value of reading the any fractal signal matrix from the first cache, a bandwidth penalty value of reading the any fractal weight matrix from the second cache, and a bandwidth penalty value of reading the operation result of the any matrix multiplication from the third cache. The bandwidth parameters are obtained based on the read/write bandwidth of the first cache, the read/write bandwidth of the second cache, and the read/write bandwidth of the third cache. Larger bandwidth indicates a smaller corresponding bandwidth penalty value.

In this manner, a cost function of transiting from the $(k-1)^{th}$ matrix multiplication to the $i^{th}$ matrix multiplication is as follows:

$$Zi=(E_{ai}+P_{ai})+(E_{bi}+P_{bi})+(2E_{ci}+P_{ci}),$$

where Zi is the cost value of transiting from the $(k-1)^{th}$ matrix multiplication to the $i^{th}$ matrix multiplication, $E_{ai}$ is used to indicate power consumption of reading a fractal signal matrix of the $i^{th}$ matrix multiplication from the first cache, $E_{bi}$ is used to indicate power consumption of reading a fractal weight matrix of the $i^{th}$ matrix multiplication from the second cache, $E_{ci}$ is used to indicate power consumption of reading an operation result of the $i^{th}$ matrix multiplication from the third cache, $P_{ai}$ is used to indicate a bandwidth penalty value of reading the fractal signal matrix of the $i^{th}$ matrix multiplication from the first cache, $P_{bi}$ is used to indicate a bandwidth penalty value of reading the fractal weight matrix of the $i^{th}$ matrix multiplication from the second cache, and $P_{ci}$ is used to indicate a bandwidth penalty value of reading the operation result of the $i^{th}$ matrix multiplication from the third cache.

Further, if the $i^{th}$ matrix multiplication reuses a fractal signal matrix of the $(k-1)^{th}$ matrix multiplication, $E_{ai}$ meets $E_{ai}$=0, and $P_{ai}$ meets $P_{ai}$=0, or if the $i^{th}$ matrix multiplication does not reuse a fractal signal matrix of the $(k-1)^{th}$ matrix multiplication, $E_{ai}$ meets $E_{ai}$=x1, and $P_{ai}$ meets $P_{ai}$=y1, if the $i^{th}$ matrix multiplication reuses a fractal weight matrix of the $(k-1)^{th}$ matrix multiplication, $E_{bi}$ meets $E_{bi}$=0, and $P_{bi}$ meets $P_{bi}$=0, or if the $i^{th}$ matrix multiplication does not reuse a fractal weight matrix of the $(k-1)^{th}$ matrix multiplication, $E_{bi}$ meets $E_{bi}$=x2, and $P_{bi}$ meets $P_{bi}$=y2, or if the $i^{th}$ matrix multiplication reuses an operation result of the $(k-1)^{th}$ matrix multiplication, $E_{ci}$ meets $E_{ci}$=0, and $P_{ci}$ meets $P_{ci}$=0, or if the $i^{th}$ matrix multiplication does not reuse an operation result of the $(k-1)^{th}$ matrix multiplication, $E_{ci}$ meets $E_{ci}$=x3, and $P_{ci}$ meets $P_{ci}$=y3.

x1, x2, x3, y1, y2, and y3 are all greater than 0. In an example, x1:x2:x3=v1:v2:v3, where v1 is the power consumption of reading the any fractal signal matrix from the first cache, v2 is the power consumption of reading the any fractal weight matrix from the second cache, and v3 is the power consumption of reading the operation result of the any matrix multiplication from the third cache, y1:y2:y3=1/w1:1/w2:1/w3, where w1 is the read/write bandwidth of the first cache, w2 is the read/write bandwidth of the second cache, and w3 is the read/write bandwidth of the third cache. For example, if the read/write bandwidth of the first cache is 50 mb/s, the read/write bandwidth of the second cache is 100 mb/s, and the read/write bandwidth of the third cache is 100 mb/s, y1=2, y2=1, and y3=1 may be set.

It can be learned from the foregoing content that, in this embodiment of this application, during determining of the cost value of transiting from the $(k-1)^{th}$ matrix multiplication to the $i^{th}$ matrix multiplication, the operation sequence of the plurality of matrix multiplications is determined based on power consumption and bandwidth such that a computing capability of a processor can be better used and power consumption of the processor can be reduced using the operation sequence.

Further, one matrix multiplication may be randomly selected from the X×H×y matrix multiplications as the first matrix multiplication. It is assumed that X meets X=8, H meets H=8, and Y meets Y=8. The first matrix multiplication may be represented as $(x_1, h_1, y_1)$. When a second node is searched for using $(x_1, h_1, y_1)$ as a search start point, because the second point may be one of 512 nodes, in this case, a cost value of transiting from $(x_1, h_1, y_1)$ to any one of the 512 nodes may be calculated, and a node with a smallest cost value (in this embodiment of this application, to avoid node repetition in the sequence, a selected node is a node other than a node that is already in the sequence, and subsequent selection is performed in the same manner) is selected as the second node. Then, a third node is searched for. The third node may be any one of 512 nodes. In this case, a cost value of transiting from $(x_1, h_1, y_1)$ to any one of the 512 nodes may be calculated, and a node with a smallest cost value is selected as the third node. Then, a fourth node is searched for, and so on. When a $512^{th}$ node is searched for, a node with a smallest cost value is selected as the last node in order to obtain the operation sequence.

Figure 10A:
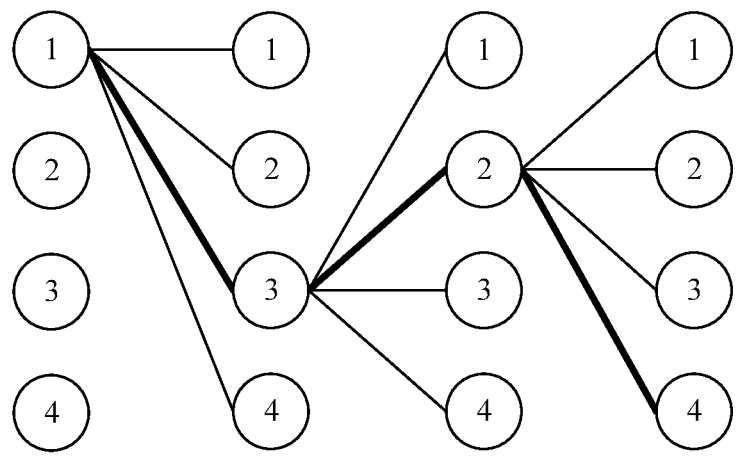
FIG. 10A is a schematic diagram of a search sequence according to an embodiment of this application.

For example, it is assumed that there are a total of four nodes: a node 1, a node 2, a node 3, and a node 4. FIG. 10A is a schematic diagram of a search sequence. As shown in FIG. 10A, when the node 1 is used as a start point to search for a second node, cost values of the node 1 and the four nodes are separately calculated, and a node with a smallest cost value is reserved, for example, the node 3. When a third node is searched for, cost values of the node 3 and the four nodes are separately calculated, and a node with a smallest cost value is reserved, for example, the node 2. When a fourth node is searched for, cost values of the node 2 and the four nodes are separately calculated, and a node with a smallest cost value is reserved, for example, the node 4. The operation sequence obtained in this way is node 1-node 3-node 2-node 4.

Figure 10B:
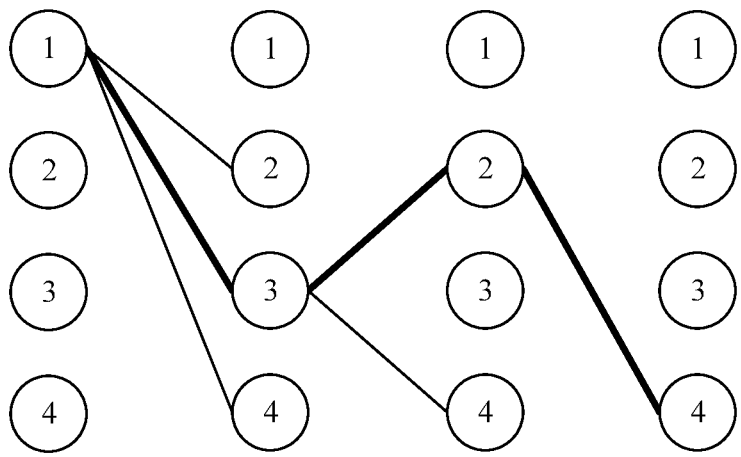
FIG. 10B is a schematic diagram of another search sequence according to an embodiment of this application.

It should be noted that, in another possible embodiment, when an $i^{th}$ node is searched for, i-1 nodes that are already in the sequence may be excluded, thereby reducing a calculation amount. For example, as shown in FIG. 10B, when the third node is searched for, cost values may be calculated only for the node 2 and the node 4, and cost values of the node 3 and the node 1 do not need to be calculated. No further details are provided.

In another example, to further improve accuracy of the obtained operation sequence, a plurality of nodes may be reserved (for example, if there are 512 nodes in total, eight nodes may be reserved) in each search step. Further, when a second node is searched for using $(x_1, h_1, y_1)$ as a start point, a cost value of transiting from $(x_1, h_1, y_1)$ to any one of the 512 nodes may be calculated, and eight sequences with smallest sums of cost values in existing sequences are reserved, to obtain candidate second nodes. Then, a third node is searched for, and in this case, a cost value of transiting from each candidate second node to any one of the 512 nodes may be calculated, and eight sequences with smallest sums of cost values in existing sequences are reserved, to obtain candidate third nodes. Then, a fourth node is searched for, and so on. When a $512^{th}$ node is searched for, a sequence with a smallest sum of cost values is selected as the operation sequence.

Figure 10C:
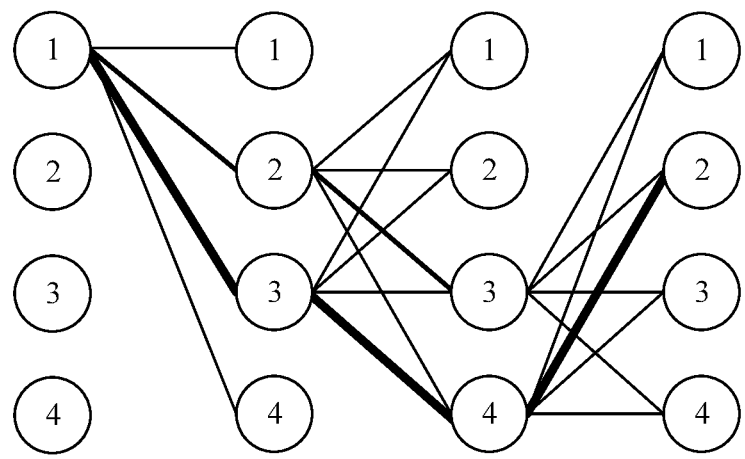
FIG. 10C is a schematic diagram of still another search sequence according to an embodiment of this application.

For example, it is assumed that there is a total of four nodes: a node 1, a node 2, a node 3, and a node 4. FIG. 10C is a schematic diagram of another search sequence. As shown in FIG. 10C, when the node 1 is used as a start point to search for a second node, cost values of the node 1 and the four nodes are separately calculated, and two sequences with smallest sums of cost values in existing sequences are reserved. The existing sequences are node 1-node 2, node 1-node 3, and node 1-node 4. Herein, node 1-node 2 is used as an example. Because transition is performed only once, a sum of cost values of the existing sequence is a cost value of transiting from the node 1 to the node 2. For example, the two sequences with smallest sums of cost values are node 1-node 2 and node 1-node 3, and therefore, the node 2 and the node 3 are candidate second nodes. When a third node is searched for, cost values of the node 2 and the four nodes, and cost values of the node 3 and the four nodes are separately calculated, and two sequences with smallest sums of cost values in existing sequences are reserved. The existing sequences are node 1-node 2-node 3, node 1-node 2-node 4, node 1-node 3-node 2, and node 1-node 3-node 4. Herein, node 1-node 2-node 3 is used as an example. Because transition is performed twice, a sum of cost values of the existing sequence is a sum of a cost value of transiting from the node 1 to the node 2 and a cost value of transiting from the node 2 to the node 3. For example, the two sequences with smallest sums of cost values are node 1-node 2-node 3 and node 1-node 3-node 4, and therefore, the node 3 and the node 4 are candidate third nodes. When a fourth node is searched for, cost values of the node 3 and the four nodes, and cost values of the node 4 and the four nodes are separately calculated, and one sequence with a smallest sum of cost values in existing sequences is reserved. The final operation sequence obtained in this way is node 1-node 3-node 4-node 2.

An embodiment of this application further provides two other manners of determining the operation sequence.

Manner 1:

$(x_1, h_1, y_1)$ is used as a search start point, a plurality of sequences that may be formed by the X×H×Y matrix multiplications are listed, a sum of cost values in each of the plurality of sequences is calculated, and then a sequence with a smallest sum of cost values is selected as the final operation sequence of the X×H×Y matrix multiplications. For a specific calculation manner of a cost value, refer to the foregoing descriptions. Details are not described herein again.

In this embodiment of this application, during calculation of a sum of cost values in a first sequence, the start point (a first node) may be ignored, and calculation directly starts from a cost value of transiting from the first node to a second node.

For example, if X meets X=8, H meets H=8, and Y meets Y=8, when $(x_1, h_1, y_1)$ is used as a search start point, there are 511! sequences that may be formed by the 8×8×8 matrix multiplications. Then, a sum of cost values in each sequence is calculated based on the foregoing formula, and the final operation sequence is obtained through comparison.

In this manner, all possible sequences are listed, and the final operation sequence is selected based on cost values corresponding to all the possible sequences. Therefore, an optimal operation sequence can be effectively determined.

Manner 2:

$(x_1, h_1, y_1)$ is used as a search start point. When an operation sequence is being searched for, only f points closest to a previous step may be searched for in each step, thereby reducing a calculation amount and reducing processing load. A value of f may be set based on an actual requirement. For example, if f meets f=8, in an example of X=8, H=8, and Y=8, a total of $8^{503}*7!$ sequences can be obtained through searching using $(x_1, h_1, y_1)$ as the search start point. Then, a cost value corresponding to each sequence may be calculated based on the foregoing formula, and the final operation sequence is obtained through comparison.

It should be noted that the operation sequence of the X×H×Y matrix multiplications in this embodiment of this application may be pre-determined and stored. In this way, when step 803 is being performed, the stored operation sequence of the X×H×Y matrix multiplications may be directly obtained such that signal processing efficiency can be improved. Alternatively, when step 803 is being performed, the operation sequence of the X×H×Y matrix multiplications may be determined based on the performance parameters. This is not limited.

Step 804: Output a signal processing result, where the signal processing result includes operation results of the plurality of matrix multiplications. The signal processing result is to be sent to a next intermediate layer of the intermediate layer at which the signal processing is performed or to an output layer of the NN.

Figure 11:
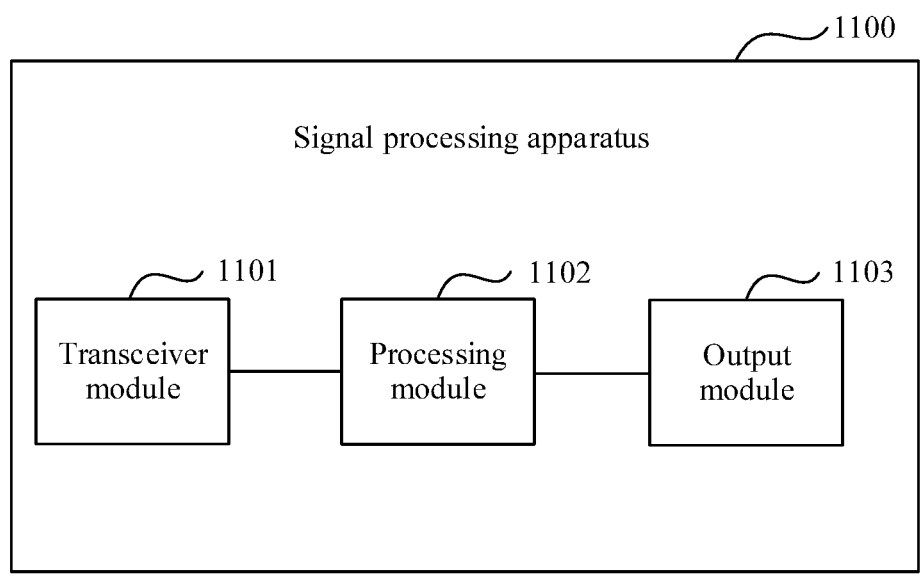
FIG. 11 is a schematic structural diagram of a signal processing apparatus according to an embodiment of this application.

Based on a same disclosure idea, an embodiment of this application further provides a signal processing apparatus. The signal processing apparatus is configured to implement the method procedure shown in FIG. 8. As shown in FIG. 11, the signal processing apparatus 1100 includes a transceiver module 1101 configured to receive a signal matrix and a weight matrix, a processing module 1102 configured to partition the signal matrix to obtain X×H fractal signal matrices, and partition the weight matrix to obtain H×Y fractal weight matrices, where the X×H fractal signal matrices and the H×Y fractal weight matrices form X×H×Y matrix multiplications, and obtain an operation sequence of the X×H×Y matrix multiplications, and process the X×H×Y matrix multiplications based on the operation sequence of the X×H×y matrix multiplications to obtain X×Y result matrices, where any one of the X×Y result matrices is obtained by accumulating operation results of at least two of the X×H×Y matrix multiplications, the operation sequence of the X×H×Y matrix multiplications is obtained based on performance parameters, and the performance parameters include power consumption of reading any one of the X×H fractal signal matrices from a first cache, power consumption of reading any one of the H×Y fractal weight matrices from a second cache, and power consumption of reading an operation result of any one of the X×H×Y matrix multiplications from a third cache, and an output module 1103 configured to output a signal processing result, where the signal processing result includes the X×Y result matrices.

In a possible design, the processing module 1102 determines the operation sequence of the X×H×Y matrix multiplications in the following manner selecting a first matrix multiplication from the X×H×Y matrix multiplications, and sequentially searching for a second matrix multiplication to an $(X \times H \times Y)^{th}$ matrix multiplication using the first matrix multiplication as a start point, to obtain the operation sequence, where the $k^{th}$ matrix multiplication is obtained through searching in the following manner selecting a matrix multiplication with a smallest cost value as the $k^{th}$ matrix multiplication based on a cost value of transiting from a $(k-1)^{th}$ matrix multiplication to any one of the X×H×Y matrix multiplications, where k is an integer greater than or equal to 2 and less than or equal to X×H×Y, and the $k^{th}$ matrix multiplication is a matrix multiplication in the X×H×Y matrix multiplications other than the first matrix multiplication to the $(k-1)^{th}$ matrix multiplication.

In a possible design, the processing module 1102 determines, in the following manner, a cost value of transiting from the $(k-1)^{th}$ matrix multiplication to an $i^{th}$ matrix multiplication, and the $i^{th}$ matrix multiplication is any one of the X×H×Y matrix multiplications:

$$Zi = E_{ai} + E_{bi} + 2E_{ci},$$

where Zi is the cost value of transiting from the $(k-1)^{th}$ matrix multiplication to the $i^{th}$ matrix multiplication, $E_{ai}$ is used to indicate power consumption of reading a fractal signal matrix of the $i^{th}$ matrix multiplication, $E_{bi}$ is used to indicate power consumption of reading a fractal weight matrix of the $i^{th}$ matrix multiplication, and $E_{ci}$ is used to indicate power consumption of reading an operation result of the $i^{th}$ matrix multiplication.

In a possible design, if the $i^{th}$ matrix multiplication reuses a fractal signal matrix of the $(k-1)^{th}$ matrix multiplication, $E_{ai}$ meets $E_{ai}=0$, or if the $i^{th}$ matrix multiplication does not reuse a fractal signal matrix of the $(k-1)^{th}$ matrix multiplication, $E_{ai}$ meets $E_{ai}=x1$, if the $i^{th}$ matrix multiplication reuses a fractal weight matrix of the $(k-1)^{th}$ matrix multiplication, $E_{bi}$ meets $E_{bi}=0$, or if the $i^{th}$ matrix multiplication does not reuse a fractal weight matrix of the $(k-1)^{th}$ matrix multiplication, $E_{bi}$ meets $E_{bi}=x2$, or if the $i^{th}$ matrix multiplication reuses an operation result of the $(k-1)^{th}$ matrix multiplication, $E_{ci}$ meets $E_{ci}=0$, or if the $i^{th}$ matrix multiplication does not reuse an operation result of the $(k-1)^{th}$ matrix multiplication, $E_{ci}$ meets $E_{ci}=x3$, where x1, x2, and x3 are all greater than 0.

In a possible design, the performance parameters further include bandwidth parameters, and the bandwidth parameters include a bandwidth penalty value of reading the any fractal signal matrix from the first cache, a bandwidth penalty value of reading the any fractal weight matrix from the second cache, and a bandwidth penalty value of reading the operation result of the any matrix multiplication from the third cache.

The bandwidth parameters are obtained based on read/write bandwidth of the first cache, read/write bandwidth of the second cache, and read/write bandwidth of the third cache.

In a possible design, the processing module 1102 determines, in the following manner, a cost value of transiting from the $(k-1)^{th}$ matrix multiplication to an $i^{th}$ matrix multiplication:

$$Zi = (E_{ai}+P_{ai}) + (E_{bi}+P_{bi}) + (2E_{ci}+2P_{ci}),$$

where Zi is the cost value of transiting from the $(k-1)^{th}$ matrix multiplication to the $i^{th}$ matrix multiplication, $E_{ai}$ is used to indicate power consumption of reading a fractal signal matrix of the $i^{th}$ matrix multiplication from the first cache, $E_{bi}$ is used to indicate power consumption of reading a fractal weight matrix of the $i^{th}$ matrix multiplication from the second cache, $E_{ci}$ is used to indicate power consumption of reading an operation result of the $i^{th}$ matrix multiplication from the third cache, $P_{ai}$ is used to indicate a bandwidth penalty value of reading the fractal signal matrix of the $i^{th}$ matrix multiplication from the first cache, $P_{bi}$ is used to indicate a bandwidth penalty value of reading the fractal weight matrix of the $i^{th}$ matrix multiplication from the second cache, and $P_{ci}$ is used to indicate a bandwidth penalty value of reading the operation result of the $i^{th}$ matrix multiplication from the third cache.

In a possible design, if the $i^{th}$ matrix multiplication reuses a fractal signal matrix of the $(k-1)^{th}$ matrix multiplication, $E_{ai}$ meets $E_{ai}=0$, and $P_{ai}$ meets $P_{ai}=0$, or if the $i^{th}$ matrix multiplication does not reuse a fractal signal matrix of the $(k-1)^{th}$ matrix multiplication, $E_{ai}$ meets $E_{ai}=x1$, and $P_{ai}$ meets $P_{ai}=y1$, if the $i^{th}$ matrix multiplication reuses a fractal weight matrix of the $(k-1)^{th}$ matrix multiplication, $E_{bi}$ meets $E_{bi}=0$, and $P_{bi}$ meets $P_{bi}=0$, or if the $i^{th}$ matrix multiplication does not reuse a fractal weight matrix of the $(k-1)^{th}$ matrix multiplication, $E_{bi}$ meets $E_{bi}=x2$, and $P_{bi}$ meets $P_{bi}=y2$, or if the $i^{th}$ matrix multiplication reuses an operation result of the $(k-1)^{th}$ matrix multiplication, $E_{ci}$ meets $E_{ci}=0$, and $P_{ci}$ meets $P_{ci}=0$, or if the $i^{th}$ matrix multiplication does not reuse an operation result of the $(k-1)^{th}$ matrix multiplication, $E_{ci}$ meets $E_{ci}$=x3, and $P_{ci}$ meets $P_{ci}$=y3, where x1, x2, x3, y1, y2, and y3 are all greater than 0.

It should be noted that, in this embodiment of this application, module division is an example, and is merely logical function division. In actual implementation, another division manner may be used. The functional modules in this embodiment of this application may be integrated into one processing module, or each module may exist alone physically, or two or more modules may be integrated into one module. The integrated module may be implemented in a form of hardware, or may be implemented in a form of a software function module.

When the integrated module is implemented in the form of a software function module and sold or used as an independent product, the integrated module may be stored in a computer-readable storage medium. Based on such an understanding, the technical solutions in this application essentially, or the part contributing to the other approaches, or all or some of the technical solutions may be implemented in a form of a software product. The computer software product is stored in a storage medium and includes instructions for instructing a computer device (which may be a personal computer, a server, a network device, or the like) or a processor to perform all or some of the steps of the method described in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the one or more computer program instructions are loaded and executed on a computer, the procedure or functions according to the embodiments of the present disclosure are all or partially generated. The computer may be a general-purpose computer, a special-purpose computer, a computer network, or another programmable apparatus. The one or more computer instructions may be stored in a computer-readable storage medium or may be transmitted from a computer-readable storage medium to another computer-readable storage medium. For example, the one or more computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by the computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD)), a semiconductor medium (for example, a solid state disk (SSD)), or the like.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. Moreover, the embodiments of the present disclosure may use a form of a computer program product that is implemented on one or more computer-usable storage media (including but not limited to a magnetic disk storage, a compact disc (CD) ROM (CD-ROM), an optical memory, and the like) that include computer-usable program code.

The embodiments of the present disclosure are described with reference to the flowcharts and/or block diagrams of the method, the device (system), and the computer program product according to the embodiments of the present disclosure. It should be understood that computer program instructions may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of another programmable data processing device to generate a machine such that the instructions executed by the computer or the processor of another programmable data processing device generate an apparatus configured to implement a specified function in one or more processes in the flowcharts and/or in one or more blocks in the block diagrams.

Alternatively, these computer program instructions may be stored in a computer readable memory that can instruct a computer or another programmable data processing device to work in a specific manner such that the instructions stored in the computer readable memory generate an artifact that includes an instruction apparatus. The instruction apparatus implements a specified function in one or more processes in the flowcharts and/or in one or more blocks in the block diagrams.

Alternatively, these computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specified function in one or more processes in the flowcharts and/or in one or more blocks in the block diagrams.

A person skilled in the art can make various modifications and variations to the embodiments of the present disclosure without departing from the spirit and scope of this application. This application is intended to cover these modifications and variations of the embodiments of the present disclosure provided that these modifications and variations fall within the scope of protection defined by the claims of this application and equivalent technologies thereof.

What is claimed is:

1. A signal processing method comprising:
receiving a signal matrix and a weight matrix;
partitioning the signal matrix to obtain X×H fractal signal matrices;
partitioning the weight matrix to obtain H×Y fractal weight matrices, wherein the X×H fractal signal matrices and the H×Y fractal weight matrices form X×H×Y matrix multiplications;
obtaining an operation sequence of the X×H×Y matrix multiplications based on performance parameters, wherein the performance parameters comprise power consumption of reading an X×H fractal signal matrix from a first cache, power consumption of reading an H×Y fractal weight matrix from a second cache, and power consumption of reading an operation result of an X×H×Y matrix multiplication from a third cache;

processing the X×H×Y matrix multiplications based on the operation sequence to obtain X×Y result matrices by accumulating operation results of a plurality of the X×H×Y matrix multiplications; and outputting a signal processing result that comprises the X×Y result matrices.

2. The signal processing method of claim 1, further comprising:

selecting a first matrix multiplication from the X×H×Y matrix multiplications; and sequentially searching for a second matrix multiplication to an (X×H×Y)$^{th}$ matrix multiplication using the first matrix multiplication as a start point, to obtain the operation sequence, wherein searching a k$^{th}$ matrix multiplication comprises selecting a matrix multiplication with a smallest cost value as the k$^{th}$ matrix multiplication based on a cost value of transiting from a (k−1)$^{th}$ matrix multiplication to one of the X×H×Y matrix multiplications, wherein k is an integer greater than or equal to 2 and less than or equal to X×H×Y, and wherein the k$^{th}$ matrix multiplication is in the X×H×Y matrix multiplications other than the first matrix multiplication to the (k−1)$^{th}$ matrix multiplication.

3. The signal processing method of claim 2, further comprising determining a cost value of transiting from the (k−1)$^{th}$ matrix multiplication to an i$^{th}$ matrix multiplication using a first formula, wherein the i$^{th}$ matrix multiplication is an X×H×Y matrix multiplication, wherein the first formula comprises:

$$Zi = E_{ai} + E_{bi} + 2E_{ci},$$

wherein Zi is the cost value of transiting from the (k−1)$^{th}$ matrix multiplication to the i$^{th}$ matrix multiplication, wherein $E_{ai}$ indicates power consumption of reading a fractal signal matrix of the i$^{th}$ matrix multiplication, wherein $E_{bi}$ indicates power consumption of reading a fractal weight matrix of the i$^{th}$ matrix multiplication, and wherein $E_{ci}$ indicates power consumption of reading an operation result of the i$^{th}$ matrix multiplication.

4. The signal processing method of claim 3, wherein $E_{ai}$=0 when the i$^{th}$ matrix multiplication reuses a fractal signal matrix in the (k−1)$^{th}$ matrix multiplication, wherein $E_{ai}$=x1 when the i$^{th}$ matrix multiplication does not reuse a fractal signal matrix of the (k−1)$^{th}$ matrix multiplication, and wherein x1 is greater than zero.

5. The signal processing method of claim 3, wherein $E_{bi}$=0 when the i$^{th}$ matrix multiplication reuses a fractal weight matrix of the (k−1)$^{th}$ matrix multiplication, wherein $E_{bi}$=x2 when the i$^{th}$ matrix multiplication does not reuse a fractal weight matrix of the (k−1)$^{th}$ matrix multiplication, and wherein x2 is greater than zero.

6. The signal processing method of claim 3, wherein $E_{ci}$=0 when the i$^{th}$ matrix multiplication reuses a fractal result matrix of the (k−1)$^{th}$ matrix multiplication, wherein $E_{ci}$=x3 when the i$^{th}$ matrix multiplication does not reuse an operation result of the (k−1)$^{th}$ matrix multiplication, and wherein x3 is greater than zero.

7. The signal processing method of claim 2, wherein the performance parameters further comprise bandwidth parameters that are based on a read/write bandwidth of the first cache, a read/write bandwidth of the second cache, and a read/write bandwidth of the third cache, and wherein the bandwidth parameters comprise a bandwidth penalty value of reading the one of the X×H fractal signal matrices from the first cache, a bandwidth penalty value of reading the one of the H×Y fractal weight matrices from the second cache, and a bandwidth penalty value of reading the operation result of the X×H×Y matrix multiplication from the third cache.

8. The signal processing method of claim 7, further comprising determining a cost value of transiting from the (k−1)$^{th}$ matrix multiplication to an i$^{th}$ matrix multiplication using a second formula, wherein the i$^{th}$ matrix multiplication is one of the X×H×Y matrix multiplications, wherein the second formula comprises:

$$Zi = (E_{ai} + P_{ai}) + (E_{bi} + P_{bi}) + (2E_{ci} + 2P_{ci}),$$

wherein Zi is the cost value of transiting from the (k−1)$^{th}$ matrix multiplication to the i$^{th}$ matrix multiplication, wherein $E_{ai}$ indicates power consumption of reading a fractal signal matrix of the i$^{th}$ matrix multiplication from the first cache, wherein $E_{bi}$ indicates power consumption of reading a fractal weight matrix of the i$^{th}$ matrix multiplication from the second cache, wherein $E_{ci}$ indicates power consumption of reading an operation result of the i$^{th}$ matrix multiplication from the third cache, wherein $P_{ai}$ indicates a bandwidth penalty value of reading the fractal signal matrix of the i$^{th}$ matrix multiplication from the first cache, wherein $P_{bi}$ indicates a bandwidth penalty value of reading the fractal weight matrix of the i$^{th}$ matrix multiplication from the second cache, and wherein $P_{ci}$ indicates a bandwidth penalty value of reading the operation result of the i$^{th}$ matrix multiplication from the third cache.

9. The signal processing method of claim 8, wherein $E_{ai}$=0 and $P_{ai}$=0 when the i$^{th}$ matrix multiplication reuses a fractal signal matrix of the (k−1)$^{th}$ matrix multiplication, wherein $E_{ai}$=x1 and $P_{ai}$=y1 when the i$^{th}$ matrix multiplication does not reuse a fractal signal matrix of the (k−1)$^{th}$ matrix multiplication, and wherein x1 and y1 are greater than zero.

10. The signal processing method of claim 8, wherein $E_{bi}$=0 and $P_{bi}$=0 when the i$^{th}$ matrix multiplication reuses a fractal weight matrix of the (k−1)$^{th}$ matrix multiplication, wherein $E_{bi}$=x2 and $P_{bi}$=y2 when the i$^{th}$ matrix multiplication does not reuse a fractal weight matrix of the (k−1)$^{th}$ matrix multiplication, and wherein x2 and y2 are greater than zero.

11. The signal processing method of claim 8, wherein $E_{ci}$=0 and $P_{ci}$=0 when the i$^{th}$ matrix multiplication reuses an operation result of the (k−1)$^{th}$ matrix multiplication, wherein $E_{ci}$=x3 and $P_{ci}$=y3 when the i$^{th}$ matrix multiplication does not reuse an operation result of the (k−1)$^{th}$ matrix multiplication, and wherein x3 and y3 are greater than zero.

12. A signal processing apparatus comprising:

an input interface configured to receive a signal matrix and a weight matrix;

a processor coupled to the input interface and configured to:

partition the signal matrix to obtain X×H fractal signal matrices;

partition the weight matrix to obtain H×Y fractal weight matrices, wherein the X×H fractal signal matrices and the H×Y fractal weight matrices form X×H×Y matrix multiplications;

obtain an operation sequence of the X×H×Y matrix multiplications based on performance parameters, wherein the performance parameters comprise power consumption of reading an X×H fractal signal matrix from a first cache, power consumption of reading an H×Y fractal weight matrix from a second cache, and power consumption of reading an operation result of an X×H×Y matrix multiplications from a third cache; and process the X×H×Y matrix multiplications based on the operation sequence to obtain X×Y result matrices by accumulating operation results of a plurality of the X×H×Y matrix multiplications; and an output interface coupled to the processor and configured to output a signal processing result that comprises the X×Y result matrices.

13. The signal processing apparatus of claim 12, wherein the processor is further configured to:

select a first matrix multiplication from the X×H×Y matrix multiplications; and sequentially search for a second matrix multiplication to an $(X \times H \times Y)^{th}$ matrix multiplication using the first matrix multiplication as a start point to obtain the operation sequence, wherein searching a $k^{th}$ matrix multiplication comprises selecting a matrix multiplication with a smallest cost value as the $k^{th}$ matrix multiplication based on a cost value of transiting from a $(k-1)^{th}$ matrix multiplication to one of the X×H×Y matrix multiplications, wherein k is an integer greater than or equal to 2 and less than or equal to X×H×Y, and wherein the $k^{th}$ matrix multiplication is in the X×H×Y matrix multiplications other than the first matrix multiplication to the $(k-1)^{th}$ matrix multiplication.

14. The signal processing apparatus of claim 13, wherein the processor is further configured to determine a cost value of transiting from the $(k-1)^{th}$ matrix multiplication to an $i^{th}$ matrix multiplication using a first formula, wherein the $i^{th}$ matrix multiplication is an X×H×Y matrix multiplication, and wherein the first formula comprises:

$$Zi = E_{ai} + E_{bi} + 2E_{ci},$$

wherein Zi is the cost value of transiting from the $(k-1)^{th}$ matrix multiplication to the $i^{th}$ matrix multiplication, wherein $E_{ai}$ indicates power consumption of reading a fractal signal matrix of the $i^{th}$ matrix multiplication, wherein $E_{bi}$ indicates power consumption of reading a fractal weight matrix of the $i^{th}$ matrix multiplication, and wherein $E_{ci}$ indicates power consumption of reading an operation result of the $i^{th}$ matrix multiplication.

15. The signal processing apparatus of claim 14, wherein $E_{ai}=0$ when the $i^{th}$ matrix multiplication reuses a fractal signal matrix of the $(k-1)^{th}$ matrix multiplication, wherein $E_{ai}=x1$ when the $i^{th}$ matrix multiplication does not reuse a fractal signal matrix of the $(k-1)^{th}$ matrix multiplication, and wherein x1 is greater than zero.

16. The signal processing apparatus of claim 14, wherein $E_{bi}=0$ when the $i^{th}$ matrix multiplication reuses a fractal weight matrix of the $(k-1)^{th}$ matrix multiplication, wherein $E_{bi}=x2$ when the $i^{th}$ matrix multiplication does not reuse a fractal weight matrix of the $(k-1)^{th}$ matrix multiplication, and wherein x2 is greater than zero.

17. The signal processing apparatus of claim 14, wherein $E_{ci}=0$ when the $i^{th}$ matrix multiplication reuses an operation result of the $(k-1)^{th}$ matrix multiplication, wherein $E_{ci}=x3$ when the $i^{th}$ matrix multiplication does not reuse a result matrix of the $(k-1)^{th}$ matrix multiplication, and wherein x3 is greater than zero.

18. The signal processing apparatus of claim 13, wherein the performance parameters further comprise bandwidth parameters that are based on read/write bandwidth of the first cache, read/write bandwidth of the second cache, and read/write bandwidth of the third cache, and wherein the bandwidth parameters comprise a bandwidth penalty value of reading the one of the X×H fractal signal matrices from the first cache, a bandwidth penalty value of reading the one of the H×Y fractal weight matrices from the second cache, and a bandwidth penalty value of reading the operation result of the X×H×Y matrix multiplication from the third cache.

19. The signal processing apparatus according to claim 18, wherein the processor determines, in the following manner, a cost value of transiting from the $(k-1)^{th}$ matrix multiplication to an $i^{th}$ matrix multiplication, wherein the $i^{th}$ matrix multiplication is one of the X×H×Y matrix multiplications:

$$Zi = (E_{ai}+P_{ai}) + (E_{bi}+P_{bi}) + (2E_{ci}+2P_{ci}),$$

wherein Zi is the cost value of transiting from the $(k-1)^{th}$ matrix multiplication to the $i^{th}$ matrix multiplication, wherein $E_{ai}$ indicates power consumption of reading a fractal signal matrix of the $i^{th}$ matrix multiplication from the first cache, wherein $E_{bi}$ indicates power consumption of reading a fractal weight matrix of the $i^{th}$ matrix multiplication from the second cache, wherein $E_{ci}$ indicates power consumption of reading an operation result of the $i^{th}$ matrix multiplication from the third cache, wherein $P_{ai}$ indicates a bandwidth penalty value of reading the fractal signal matrix of the $i^{th}$ matrix multiplication from the first cache, wherein $P_{bi}$ indicates a bandwidth penalty value of reading the fractal weight matrix of the $i^{th}$ matrix multiplication from the second cache, and wherein $P_{ci}$ indicates a bandwidth penalty value of reading the operation result of the $i^{th}$ matrix multiplication from the third cache.

20. The signal processing apparatus of claim 19, wherein:

$E_{ai}=0$ and $P_{ai}=0$ when the $i^{th}$ matrix multiplication reuses a fractal signal matrix of the $(k-1)^{th}$ matrix multiplication, and $E_{ai}=x1$ and $P_{ai}=y1$ when $i^{th}$ matrix multiplication does not reuse a fractal signal matrix of the $(k-1)^{th}$ matrix multiplication;

$E_{bi}=0$ and $P_{bi}=0$ when the $i^{th}$ matrix multiplication reuses a fractal weight matrix of the $(k-1)^{th}$ matrix multiplication, and $E_{bi}=x2$ and $P_{bi}=y2$ when the $i^{th}$ matrix multiplication does not reuse a fractal weight matrix of the $(k-1)^{th}$ matrix multiplication; or $E_{ci}=0$ and $P_{ci}=0$ when the $i^{th}$ matrix multiplication reuses an operation result of the $(k-1)^{th}$ matrix multiplication, and $E_{ci}=x3$ and $P_{ci}=y3$ when the $i^{th}$ matrix multiplication does not reuse an operation result of the $(k-1)^{th}$ matrix multiplication, wherein x1, x2, x3, y1, y2, and y3 are all greater than zero.

* * * * *